United States Patent
Vlachogiannis et al.

(10) Patent No.: US 10,911,369 B2
(45) Date of Patent: Feb. 2, 2021

(54) PROCESSING EVENT DATA USING DYNAMIC DATA SERVER NODES

(71) Applicant: Splunk Inc., San Francisco, CA (US)

(72) Inventors: Ioannis Vlachogiannis, San Francisco, CA (US); Panagiotis Papadomitsos, San Francisco, CA (US); Vassilis Karampinas, San Francisco, CA (US); Maria Nasioti, San Francisco, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 15/493,073

(22) Filed: Apr. 20, 2017

(65) Prior Publication Data

US 2017/0237683 A1    Aug. 17, 2017

Related U.S. Application Data

(63) Continuation of application No. 14/686,669, filed on Apr. 14, 2015, now Pat. No. 9,660,930, which is a
(Continued)

(51) Int. Cl.
*H04L 12/911* (2013.01)
*G06F 16/248* (2019.01)
(Continued)

(52) U.S. Cl.
CPC .......... *H04L 47/745* (2013.01); *G06F 16/248* (2019.01); *G06F 16/2477* (2019.01);
(Continued)

(58) Field of Classification Search
CPC ..... H04L 67/025; H04L 67/36; H04L 41/069; H04L 67/02; H04L 41/0806;
(Continued)

(56) References Cited

U.S. PATENT DOCUMENTS 6,496,908 B1    12/2002 Kamvysselis et al.
6,782,410 B1    8/2004 Bhagat et al.
(Continued)

OTHER PUBLICATIONS

Notice of Allowance dated May 7, 2018 in U.S. Appl. No. 15/665,001, 10 pages.
(Continued)

*Primary Examiner* — Jason D Recek
(74) *Attorney, Agent, or Firm* — Shook, Hardy & Bacon L.L.P.

(57) ABSTRACT

A system of dynamically-instantiated data server components provides access to a data repository. Different data server components are assigned to different data collections in the repository. A distribution component receives messages and, based on data collection identifiers associated with the messages, routes the messages to corresponding data server components. Based on the messages, the data server components perform data operations with respect to their corresponding data collections. Data server components may be terminated when their assigned data collections are not in use. When an incoming message is associated with a data collection for which no data server component exists, the distribution component dynamically instantiates a new data server component for the data collection. In an embodiment, data server components make working copies of their respectively assigned data collections in a high-speed memory. By terminating inactive data server components, the system makes room in the memory for active data collections.

19 Claims, 11 Drawing Sheets

Related U.S. Application Data continuation of application No. 14/217,454, filed on Mar. 17, 2014, now abandoned.

(51) Int. Cl.
  *G06F 16/2458* (2019.01)
  *G06F 16/9535* (2019.01)
  *H04L 12/24* (2006.01)
  *H04L 29/08* (2006.01)

(52) U.S. Cl.
  CPC ........ *G06F 16/9535* (2019.01); *H04L 41/069* (2013.01); *H04L 41/0806* (2013.01); *H04L 67/025* (2013.01); *H04L 67/36* (2013.01); *H04L 67/02* (2013.01)

(58) Field of Classification Search
  CPC ............... H04L 47/745; G06F 16/2477; G06F 16/9535; G06F 16/248
  See application file for complete search history.

(56) References Cited

U.S. PATENT DOCUMENTS

| | | |
|---|---|---|
| 7,346,805 B1 | 3/2008 | Scharland et al. |
| 7,519,870 B1 | 4/2009 | Sim-Tang |
| 7,558,928 B1 | 7/2009 | DeVos |
| 7,581,007 B2 | 8/2009 | Yamagami |
| 7,937,344 B2 | 5/2011 | Baum et al. |
| 7,970,949 B2 | 6/2011 | Pope et al. |
| 8,112,425 B2 | 2/2012 | Baum et al. |
| 8,335,969 B2 | 12/2012 | Gubbi et al. |
| 8,352,494 B1* | 1/2013 | Badoiu ................. G06F 16/532 707/772 |
| 8,429,482 B1 | 4/2013 | Payne et al. |
| 8,484,242 B1 | 7/2013 | Singh et al. |
| 8,751,486 B1* | 6/2014 | Neeman ............ G06F 17/30908 707/722 |
| 8,751,529 B2 | 6/2014 | Zhang et al. |
| 8,788,525 B2 | 7/2014 | Neels et al. |
| 8,825,937 B2 | 9/2014 | Atkisson et al. |
| 8,898,520 B1 | 11/2014 | Ford et al. |
| 8,977,595 B1 | 3/2015 | Leonard |
| 8,990,637 B1 | 3/2015 | Vlachogiannis et al. |
| 9,208,000 B2 | 12/2015 | Vlachogiannis et al. |
| 9,215,240 B2 | 12/2015 | Merza et al. |
| 9,286,413 B1 | 3/2016 | Coates et al. |
| 9,355,006 B2 | 5/2016 | Vlachogiannis et al. |
| 9,514,021 B2 | 12/2016 | Vlachogiannis et al. |
| 9,660,930 B2 | 5/2017 | Vlachogiannis et al. |
| 9,753,818 B2 | 9/2017 | Vlachogiannis et al. |
| 9,838,346 B2 | 12/2017 | Vlachogiannis et al. |
| 9,838,467 B2 | 12/2017 | Vlachogiannis et al. |
| 10,055,312 B2 | 8/2018 | Papadomitsos et al. |
| 10,061,680 B2 | 8/2018 | Vlachogiannis et al. |
| 10,127,258 B2 | 11/2018 | Lamas et al. |
| 10,545,838 B2 | 1/2020 | Papadomitsos et al. |
| 10,599,529 B2 | 3/2020 | Vlachogiannis et al. |
| 2001/0047390 A1 | 11/2001 | McGann et al. |
| 2002/0016827 A1 | 2/2002 | McCabe et al. |
| 2002/0052909 A1 | 5/2002 | Seeds |
| 2002/0165864 A1 | 11/2002 | Azagury et al. |
| 2003/0009553 A1 | 1/2003 | Benfield et al. |
| 2003/0018483 A1 | 1/2003 | Pickover et al. |
| 2003/0126387 A1 | 7/2003 | Watanabe |
| 2003/0158847 A1* | 8/2003 | Wissner ............... H04L 67/1036 |
| 2004/0003069 A1 | 1/2004 | Wong |
| 2004/0024771 A1 | 2/2004 | Jain et al. |
| 2004/0078438 A1 | 4/2004 | Pyle et al. |
| 2004/0133622 A1 | 7/2004 | Clubb et al. |
| 2004/0163115 A1 | 8/2004 | Butzer |
| 2004/0181600 A1 | 9/2004 | Yamagami |
| 2005/0010753 A1 | 1/2005 | Marceau et al. |
| 2005/0027892 A1 | 2/2005 | McCabe et al. |
| 2005/0071527 A1 | 3/2005 | Cordina et al. |
| 2005/0081080 A1 | 4/2005 | Bender et al. |
| 2005/0086359 A1 | 4/2005 | Banerjee et al. |
| 2005/0114510 A1 | 5/2005 | Error et al. |
| 2005/0172054 A1 | 8/2005 | Mathrubutham et al. |
| 2005/0212903 A1 | 9/2005 | Corbett et al. |
| 2005/0240677 A1 | 10/2005 | Liu et al. |
| 2006/0010347 A1 | 1/2006 | Sugihara |
| 2006/0112114 A1 | 5/2006 | Yu et al. |
| 2007/0011267 A1 | 1/2007 | Overton et al. |
| 2007/0094206 A1 | 4/2007 | Yu et al. |
| 2007/0162637 A1 | 7/2007 | Mirabeau et al. |
| 2007/0207793 A1 | 9/2007 | Myer et al. |
| 2008/0022183 A1 | 1/2008 | Arslan et al. |
| 2008/0091491 A1 | 4/2008 | Thorpe et al. |
| 2008/0091806 A1 | 4/2008 | Shen et al. |
| 2008/0243845 A1 | 10/2008 | Wouhaybi et al. |
| 2009/0157641 A1 | 6/2009 | Anderson et al. |
| 2009/0234908 A1 | 9/2009 | Reyhner et al. |
| 2010/0017532 A1 | 1/2010 | Bowen |
| 2010/0050055 A1 | 2/2010 | Tanaka et al. |
| 2010/0058012 A1 | 3/2010 | Okada et al. |
| 2010/0250748 A1 | 9/2010 | Sivasubramanian et al. |
| 2010/0281000 A1 | 11/2010 | Lehr et al. |
| 2011/0022801 A1 | 1/2011 | Flynn |
| 2011/0191290 A1* | 8/2011 | Gutlapalli ............... G06F 16/00 707/610 |
| 2011/0213886 A1 | 9/2011 | Kelkar et al. |
| 2011/0258391 A1 | 10/2011 | Atkisson et al. |
| 2012/0066271 A1 | 3/2012 | Chandrasekar et al. |
| 2012/0124294 A1 | 5/2012 | Atkisson et al. |
| 2012/0198052 A1 | 8/2012 | Ljung et al. |
| 2012/0198175 A1 | 8/2012 | Atkisson |
| 2012/0210041 A1 | 8/2012 | Flynn et al. |
| 2012/0215997 A1 | 8/2012 | Stanfill et al. |
| 2012/0246556 A1 | 9/2012 | Chikirivao et al. |
| 2012/0278678 A1 | 11/2012 | Kruglick |
| 2012/0310427 A1 | 12/2012 | Williams et al. |
| 2013/0036375 A1 | 2/2013 | Zavatone et al. |
| 2013/0067179 A1 | 3/2013 | Paleologu et al. |
| 2013/0090961 A1 | 4/2013 | Smith |
| 2013/0103708 A1 | 4/2013 | Kim et al. |
| 2013/0135997 A1 | 5/2013 | Lee |
| 2013/0144736 A1* | 6/2013 | Vodopia ............... G07G 1/0045 705/20 |
| 2013/0191601 A1 | 7/2013 | Peterson et al. |
| 2013/0212267 A1 | 8/2013 | Kern et al. |
| 2013/0290931 A1 | 10/2013 | Wall et al. |
| 2013/0332996 A1 | 12/2013 | Fiala et al. |
| 2014/0032566 A1* | 1/2014 | Agarwal ........... G06F 17/30011 707/741 |
| 2014/0040884 A1 | 2/2014 | Donahue |
| 2014/0046956 A1 | 2/2014 | Zenger et al. |
| 2014/0047107 A1 | 2/2014 | Maturana et al. |
| 2014/0068083 A1 | 3/2014 | Tyagi et al. |
| 2014/0081906 A1 | 3/2014 | Geddam et al. |
| 2014/0095505 A1 | 4/2014 | Blanchflower et al. |
| 2014/0156038 A1 | 6/2014 | Poyhtari et al. |
| 2014/0180826 A1 | 6/2014 | Boal |
| 2014/0215057 A1 | 7/2014 | Walsh et al. |
| 2014/0298009 A1 | 10/2014 | Hattori et al. |
| 2014/0337345 A1 | 11/2014 | Motoyama |
| 2014/0337442 A1 | 11/2014 | Zhuang et al. |
| 2015/0019812 A1 | 1/2015 | Ban |
| 2015/0186064 A1 | 7/2015 | Chen et al. |
| 2015/0222723 A1 | 8/2015 | Adapalli et al. |
| 2015/0261455 A1 | 9/2015 | Gough et al. |
| 2015/0261585 A1 | 9/2015 | Vlachogiannis et al. |
| 2015/0261622 A1 | 9/2015 | Vlachogiannis et al. |
| 2015/0264002 A1 | 9/2015 | Vlachogiannis et al. |
| 2015/0264152 A1 | 9/2015 | Vlachogiannis et al. |
| 2015/0295848 A1 | 10/2015 | Vlachogiannis et al. |
| 2015/0301861 A1 | 10/2015 | LaChiusa et al. |
| 2016/0019636 A1 | 1/2016 | Adapalli et al. |
| 2016/0055071 A1 | 2/2016 | Vlachogiannis et al. |
| 2016/0085637 A1 | 3/2016 | Vlachogiannis et al. |
| 2016/0087855 A1 | 3/2016 | Vlachogiannis et al. |
| 2016/0246696 A1 | 8/2016 | Vlachogiannis et al. |
| 2017/0046244 A1 | 2/2017 | Vlachogiannis et al. |
| 2017/0237683 A1 | 8/2017 | Vlachogiannis et al. |

(56) References Cited

U.S. PATENT DOCUMENTS

| | | |
|---|---|---|
| 2017/0357554 A1 | 12/2017 | Papadomitsos et al. |
| 2018/0054474 A1 | 2/2018 | Vlachogiannis et al. |
| 2018/0077035 A1 | 3/2018 | Vlachogiannis et al. |
| 2018/0336118 A1 | 11/2018 | Vlachogiannis et al. |
| 2019/0098106 A1 | 3/2019 | Mungel et al. |
| 2020/0044948 A1 | 2/2020 | Vlachogiannis et al. |
| 2020/0226036 A1 | 7/2020 | Papadomitsos et al. |

OTHER PUBLICATIONS

U.S. Appl. No. 14/217,454, Non-Final Office Action dated Jul. 30, 2014.
U.S. Appl. No. 14/217,454, Final Office Action dated Jan. 14, 2015.
U.S. Appl. No. 14/217,454, Advisory Action dated Mar. 20, 2015.
U.S. Appl. No. 14/686,669, Non-Final Office Action dated Sep. 11, 2015.
U.S. Appl. No. 14/686,669, Final Office Action dated Jan. 11, 2016.
U.S. Appl. No. 14/686,669, Non-Final Office Action dated May 6, 2016.
U.S. Appl. No. 14/686,669, Notice of Allowance dated Feb. 10, 2017.
Vlachogiannis, Jon, "BigData Using Erlang, C and Lisp to Fight the Tsunami of Mobile Data", High Scalability, dated Nov. 26, 2012, 8 pages.
Notice of Allowance dated Sep. 8, 2017 in U.S. Appl. No. 14/699,996, 6 pages.
Notice of Allowance dated Sep. 12, 2017 in U.S. Appl. No. 14/699,984, 8 pages.
Notice of Allowance dated Sep. 12, 2017 in U.S. Appl. No. 14/699,992, 8 pages.
Non-Final Office Actions dated Jul. 28, 2016 in U.S. Appl. No. 14/530,445, 19 pages.
Non-Final Office Action dated Apr. 6, 2017 in U.S. Appl. No. 14/699,984, 29 pages.
Final Office Action dated Feb. 2, 2017 in U.S. Appl. No. 14/530,445, 19 pages.
Non-Final Office Action dated Apr. 7, 2017 in U.S. Appl. No. 14/699,992, 26 pages.
Non-Final Office Action dated Apr. 10, 2017 in U.S. Appl. No. 14/699,996, 25 pages.
Notice of Allowance dated May 10, 2017 in U.S. Appl. No. 14/530,445, 9 pages.
Non-Final Office Action dated Jan. 11, 2019 in U.S. Appl. No. 15/799,682, 23 pages.
Non-Final Office Action dated Jan. 11, 2019 in U.S. Appl. No. 15/799,720, 23 pages.
Notice of Allowance dated Sep. 19, 2019 in U.S. Appl. No. 16/038,683, 11 pages.
Notice of Allowance dated Sep. 26, 2019 in U.S. Appl. No. 15/799,662, 8 pages.
Notice of Allowance dated May 8, 2019 in U.S. Appl. No. 15/799,682, 9 pages.
Notice of Allowance dated May 13, 2019 in U.S. Appl. No. 15/799,720, 9 pages.
Non-Final Office Action dated Jun. 14, 2019 in U.S. Appl. No. 15/799,662, 6 pages.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, pp. 9.
Carasso, David, "Exploring Splunk," published by CITO Research, New York, NY, Apr. 2012, pp. 156.
Splunk Cloud 8.0.2004 User Manual, available online, retrieved May 20, 2020 from docs.splunk.com, pp. 66.
Splunk Enterprise 8.0.0 Overview, available online, retrieved May 20, 2020 from docs.splunk.com, pp. 17.
Splunk Quick Reference Guide, updated 2019, available online at https://www.splunk.com/pdfs/solution-guides/splunk-quick-reference-guide.pdf, retrieved May 20, 2020, pp. 6.
U.S. Appl. No. 14/217,454, of Ioannis Vlachogiannis filed Mar. 17, 2014, 53 pages.

* cited by examiner

510 Receive a construct that indicates that the data server system is to establish a time context

520 Receive a first instruction, within the time context, that specifies a first operation to perform with respect to a first set of data

530 Perform the first operation with respect to only those items in the first set of data that are associated with timestamps that occur within the time period defined for the time context

540 Create or update a time context variable to store a calculation

550 Receive an embedded time construct that defines an embedded time context

560 Receive a second instruction, within the embedded time context, that specifies a second operation to perform with respect to the first set of data

570 Perform the second operation with respect to only those items, in the first set of data, that are associated with timestamps that occur within the time period defined for the embedded time context

580 Receive a construct that terminates the embedded time context

590 Receive a construct that terminates the original time context

PROCESSING EVENT DATA USING DYNAMIC DATA SERVER NODES

CROSS-REFERENCE TO RELATED APPLICATIONS

The present application claims benefit as a Continuation of U.S. application Ser. No. 14/686,669, filed Apr. 14, 2015, which claims benefit as a Continuation of U.S. application Ser. No. 14/217,454, filed Mar. 17, 2014, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to data processing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Generally, a data server system is a system that performs data operations with respect to data stored in one or more repositories of data. Depending on the type of data server system, the data operations may range from simple operations, such as storing and retrieving the data, to more complex operations such as calculating statistics based on the data, and/or arranging or formatting the data. One example of a data server system is a relational database system, in which data is stored in highly structured tables, and accessed through rigid schemas. Another example of a data server system is a file system, such as a Network File System server. Yet another example of a data server system is a web application server.

Another example of a data server system is an event-based system, such as the SPLUNK Enterprise software produced and sold for on-premise and cloud use by Splunk Inc. of San Francisco, Calif. In some event-based systems, data is derived from lines or rows of unstructured time-series data. Some of the many examples of such data include web logs and machine logs. Each row (or a group of rows) is generally associated with a timestamp and a series of one or more associated data points or parameter-value pairs. Based on the timestamps, data structures known as events are derived from the associated data and include a portion of the associated data. A variety of event types may be derived from such data. For example, in the context of web logs, events may be derived for errors, specific user inputs, navigation events, and so forth.

Some event-based systems feature flexible schemas that may be redefined as needed, or even at the time that a request to perform an operation is received. Such a schema indicates how to extract one or more pieces of data from the associated data included in an event.

In these and other types of data server systems, it can be difficult to optimally perform data operations, particularly as the size and/or complexity of a data repository grows. System administrators may add additional system resources to improve performance, but often these resources may not achieve the desired results, and/or the added expense and overhead for the additional system resources is undesirable.

BRIEF DESCRIPTION OF THE DRAWINGS

In the drawings:

FIG. 5 illustrates an example process flow for utilizing a construct that defines a time context in which a data server system should operate;

DETAILED DESCRIPTION

Figure 1:
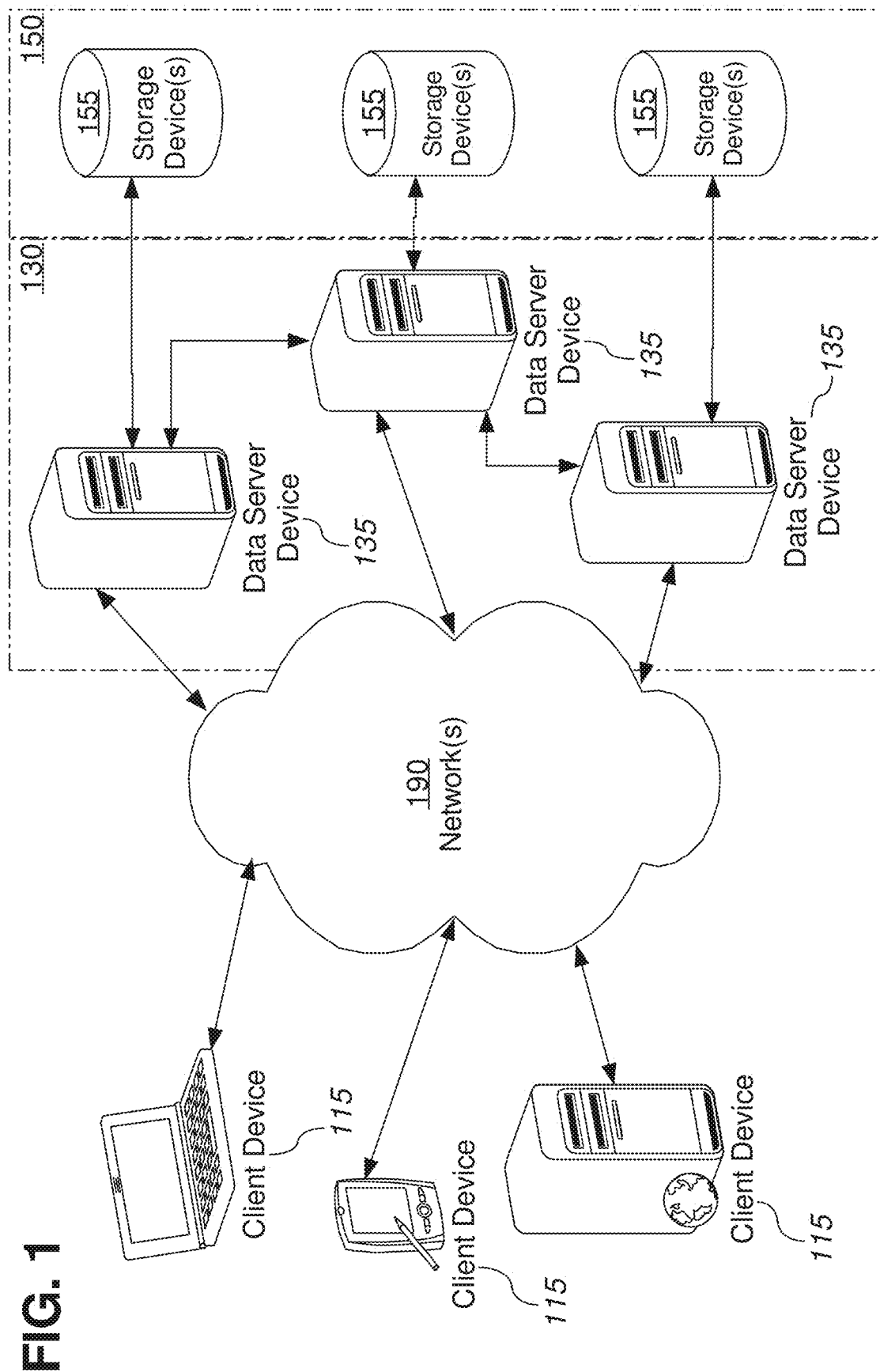
FIG. 1 illustrates an example network-based system of computing devices in which the described techniques may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Operating Environment
2.2. Data Repository
2.3. Data Server Nodes
2.4. Collection Loaders/Savers
2.5. Message routers
2.6. Node Instantiation Components
2.7. Node Monitors
2.8. Variations
3.0. Functional Overview
3.1. Servicing Data Requests with Data Server Nodes
3.2. Reclaiming Resources from Inactive Nodes
3.3. Utilizing Time Contexts
4.0. Example Data Server Node
5.0. Example Data Processing Instructions
6.0. Example User Interfaces
7.0. Implementation Mechanisms—Hardware Overview
8.0. Example Embodiments
9.0. Extensions and Alternatives

1.0. General Overview

According to embodiments, a system of isolated, dynamically-instantiated data server components provides efficient access to a repository of data that has been subdivided into data collections. Each of the data collections may comprise, for instance, time-series event logs, database table(s), and/or other type(s) of data structures. The data server components, hereinafter referred to as data server nodes, provide access to the repository by performing read and write operations on the data within the repository in response to messages from the clients. Each data server node provides access to only some, or even just one, of the data collections within the data repository. A data server node that provides access to a particular data collection is said to be assigned to that particular data collection. One or more distribution nodes receive messages from clients and, based on data collection identifiers associated with the messages, route the messages to the assigned data server nodes. In an embodiment, among other effects, because each data server node operates on only a limited collection of data, the data server nodes execute more efficiently by avoiding unnecessary overhead for managing and interpreting the other data collections found within the repository.

Furthermore, because each data server node operates on only a portion of the repository, data server nodes may be terminated after a certain period of time when the data collections to which they are assigned are not in use. The distribution node(s) keeps track of the existing data server nodes and their assigned data collections. When a distribution node receives a message that is associated with a data collection for which no data server node exists—either because the data collection has not yet been accessed or because the data server node previously assigned to the data collection was terminated—the distribution node dynamically instantiates a new data server node and assigns the data collection to the new server node. The distribution node(s) will then route messages associated with the data collection to the new data server node until the new data server node is terminated. In this manner, among other effects, system resources allocated to "inactive" data server nodes are freed up for other data server nodes. Thus, the system avoids unnecessarily wasting processing resources with dormant data server processes.

Moreover, in an embodiment, the system may be configured such that some or all of the data server nodes copy their respectively assigned data collections, in whole or in part, from a slower storage in which the data collections are persistently stored to a random access memory ("RAM") or another high-speed memory. The data server nodes then operate entirely with respect to this copy—the working copy—of its data collection, though other processes may copy the working copy back to the persistent storage as needed. While it would typically be impractical to store an entire data repository within a high speed memory, it is much more practical to store only the data collections that are actively being used in a high speed memory. By terminating inactive data server nodes when they are not needed, their corresponding data collections are consequently removed from the higher-speed memory, making room for data collections that are actively being used. Thus, this embodiment allows for, among other advantages, data server nodes that store working copies of their assigned data collection(s) entirely within a higher speed memory, without requiring that the higher speed memory be large enough to store the entire repository. Consequently, the speed with which the data server nodes operate is typically greatly increased.

In an embodiment, different data collections in such a data server system are assigned to different software applications. A developer of a software application is assigned a unique identifier referred to as an application key, and instructed to embed the application key in any requests that the software application makes to the data server system. In this manner, when end users run the software application on their devices, the software application may access the same data collection regardless of on which devices the software application executes. The software application may then utilize the data collection for a variety of purposes, such as tracking application usage and performance, logging error messages, maintaining user records, and so forth.

In an embodiment, the operator of the data server system may further provide developers with software libraries and/or application programming interfaces that, when called from within the software application, automatically cause the software application to send event messages related to the foregoing, along with the assigned application key, to the data server system. The data server system logs the event messages to the corresponding data collection, and then provides analytics with respect to the event messages, as requested by the developer. For instance, a mobile software developer may utilize such functionality to track how many devices have installed the developer's software, the types of devices on which the software is installed, how frequently the software is accessed, how frequently certain types of errors occur, and so forth. In other embodiments, however, data collections do not necessarily correspond to specific software applications, and/or a software application may access multiple data collections independently of any software libraries or application programming interfaces provided by the operator of the data server system.

According to an embodiment, a data server system provides an enhanced interface for requesting performance of time-related data operations. The data server system is configured to receive and recognize one or more constructs that define a time context in which the data server system should operate. The time context is an arbitrary time period relative to which certain data operations should be performed. Once such a construct is received, the data server system receives commands to perform a plurality of operations within the time context until the time context is terminated and/or a new time context is defined. The commands need not each redefine the time context, greatly simplifying the statements needed to instruct the data server system to perform certain operations and/or algorithms. According to an embodiment, another construct defines an embedded time context, which overrides an existing time context until the embedded time context is terminated.

In an embodiment, the above constructs are provided in the context of a scripting language supported by the interface and interpretable by data server nodes such as described herein. Other aspects of the scripting language are described herein. In yet other embodiments, a data server system is configured to perform data operations on incoming messages, or requested by incoming messages, by processing data within the messages and/or within a data collection using scripts written in a scripting language such as already stated. The scripts enable the data server system to receive and process requests to perform data operations that are based on complex, customizable algorithms, in addition to requests that include more traditional query statements. In an embodiment, the scripts are not compiled, but rather interpreted in real time, and thus may be added or changed dynamically without restarting the data server system.

According to an embodiment, a data server system supports the generation of view modules based on a data collection. View modules comprise data visualizations such as described herein. Each view module, including its data and corresponding visualization technique, is described by a script, such as already stated. The data server system returns the view modules, alone or in a group, via a web page, image, or other data, to a web browser or other suitable client application.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Structural Overview 2.1. Operating Environment

The data processing techniques described herein are suitable for use by systems deployed in a variety of operating environments. For example, FIG. 1 illustrates an example network-based system 100 of computing devices in which the described techniques may be practiced, according to an embodiment.

System 100 comprises one or more data storage devices 155 that collectively store, among other data, one or more data repositories 150. The data storage devices may be, for instance, non-volatile computer-readable media such as hard disk drives, flash/SSD drives, RAM, and so forth. Additionally, or instead, the data storage devices may be devices that comprise non-volatile computer-readable media, such as disk arrays, storage area network devices, networked-attached storage devices, file server devices, or any other suitable data storage apparatus. Storage devices 155 may store the one or more repositories in any suitable underlying form(s), such as disk blocks, file structures, and/or database tables. Where multiple storage devices 155 are used, different portions of a data repository 150 may be stored on different storage devices 155. Optionally, certain storage devices 155 may be configured to store some or all portions of a data repository 150 redundantly, using any suitable backup and/or synchronization mechanism(s).

System 100 further comprises one or more client devices 115 that directly or indirectly require read and/or write access to the one or more data repositories 150. Client devices 115 are general or special-purpose computers, such as personal computers, mobile phones, tablet computers, laptop computers, web servers, application servers, and so forth. Depending on the embodiment, client devices 115 may all be a same type of computing device, or client devices 115 may include a number of different types of computing devices. Generally, client devices 155 comprise one or more processors and/or other suitable components configured to execute computer-readable instructions.

The computer-readable instructions executed by client devices 155 implement logic for one or more client applications. These client applications may be, for instance, standalone applications whose instructions are found in software packages that have been installed on the executing computing devices, browser-based applications that are downloaded and executed transiently within the context of a web browser, web applications whose instructions are executed by a web application server in response to requests from other client applications, "plug-in" modules of code whose instructions are called in response to various triggering events within the context of other applications or the operating system itself, and so forth. Each client device 155 may execute any number of client applications that require access to data repositories 150.

System 100 further comprises one or more data server devices 135. Data server devices 135 may be general or special-purpose computers, comprising one or more processors and/or other suitable components configured to execute instructions for processing and manipulating data within the data repositories 150. Data server devices 135 may be coupled to data storage devices 155 using any suitable mechanism, such as a Fiber Channel network, a Serial ATA link, a Universal Serial Bus connection, an Infiniband link, an Ethernet connection, and so forth. Data server devices 135 send input/output requests to storage devices 155. These input/output requests may be communicated via messages in any suitable protocol(s), depending on the environment, including, without limitation, Server Message Block protocol, Network File System protocol, Small Computer System Interface protocol, and/or Fibre Channel Protocol. In response, data server devices 135 receive data structures such as data blocks, files, tables, result sets, and so forth. In an embodiment, the data server devices 135 may actually comprise some or all of the storage devices 155.

The instructions for processing and manipulating data that are executed by the data server devices 135 generally implement data server processes. These processes provide client devices 115 with read and/or write access to the one or more data repositories 150 by performing data operations in response to requests from the client devices 115. These processes may also or instead perform data operations with respect to the one or more data repositories 150 that are triggered by messages from the client devices 115, rather than explicitly requested by client devices 115. The data operations supported by these processes may include relatively simple operations such as adding or retrieving lines or rows of data from the data storage devices. In some embodiments, the supported data operations may further include, without limitation, operations such as filtering the contents of retrieved data, or performing aggregations or other calculations based on the retrieved data.

In an embodiment, these data server processes generally constitute one or more event streaming engines, optionally offering data semantics and processing during the data input phase and/or data analysis phase. In another embodiment, these data server processes generally constitute one or more conventional database servers, such as a relational database server. However, in other embodiments, these processes need not necessarily support the entire functionality of an event streaming engine or database server, or even operate on conventional database or event structures. Moreover, in at least one embodiment, the data server processes provide support for data operations hitherto not found in any conventional database server or event streaming engine.

In an embodiment, each of storage devices 155 are equally accessible to each of the data server devices 135, and thus any data server device 135 may perform operations on any data stored within the data repository 150. In other embodiments, each data server device 135 is assigned to only some or even one of the data storage devices 155, and is only configured to perform operations on the storage device(s) 155 to which it is assigned.

The data server devices 135 comprise network interface components that receive messages from client devices 115 over one or more networks 190. The data server devices 135 further utilize these network interface components to reply to client devices 115 with data resulting from at least some of these data operations. The one or more networks 190 may include any combination of wide-area networks such as the Internet, virtual networks, and/or local networks. Different client devices 115 may send requests to different data server devices 135, or the client devices 115 may be configured to send requests to only one of the data server devices 135. In the former embodiment, different client devices 115 may be configured to send requests directly to different ones of data server devices 135, or all client devices 115 may be configured to send requests to a load balancer within the network(s) 190. The load balancer then determines to which of data server devices 135 a given request should be sent based on factors such as server load and latency.

In an embodiment, the data server devices 135 collectively implement a data server system 130 for accessing a data repository 150. A client device 115 may access the data repository 150 through any of the data server devices 135. The data server devices 135 may further communicate amongst themselves to request that different data server devices 135 perform certain operations or portions thereof. For example, the data server devices 135 may support algorithms and/or frameworks for parallelizing certain operations, such as the MapReduce framework. As another example, a data server device 135 may be configured to ship operations to other data server devices 135 if the data server device 135 is unable to access a data storage device 155 upon which necessary data is stored. In an embodiment, additional data server devices 135 may be added to the data server system 130 on demand.

System 100 is only one example of the many types of operating environments in which the techniques described herein may be practiced. Other suitable operating environments may include additional or fewer elements, in varying arrangements. For instance, in an embodiment, some or all of the data server devices 135 are replaced by virtual server devices, some or all of which may execute on a single computing device. In another embodiment, some or all of the client applications may execute on the same computing device as some or all of the data server processes.

2.2. Data Repository

Figure 2:
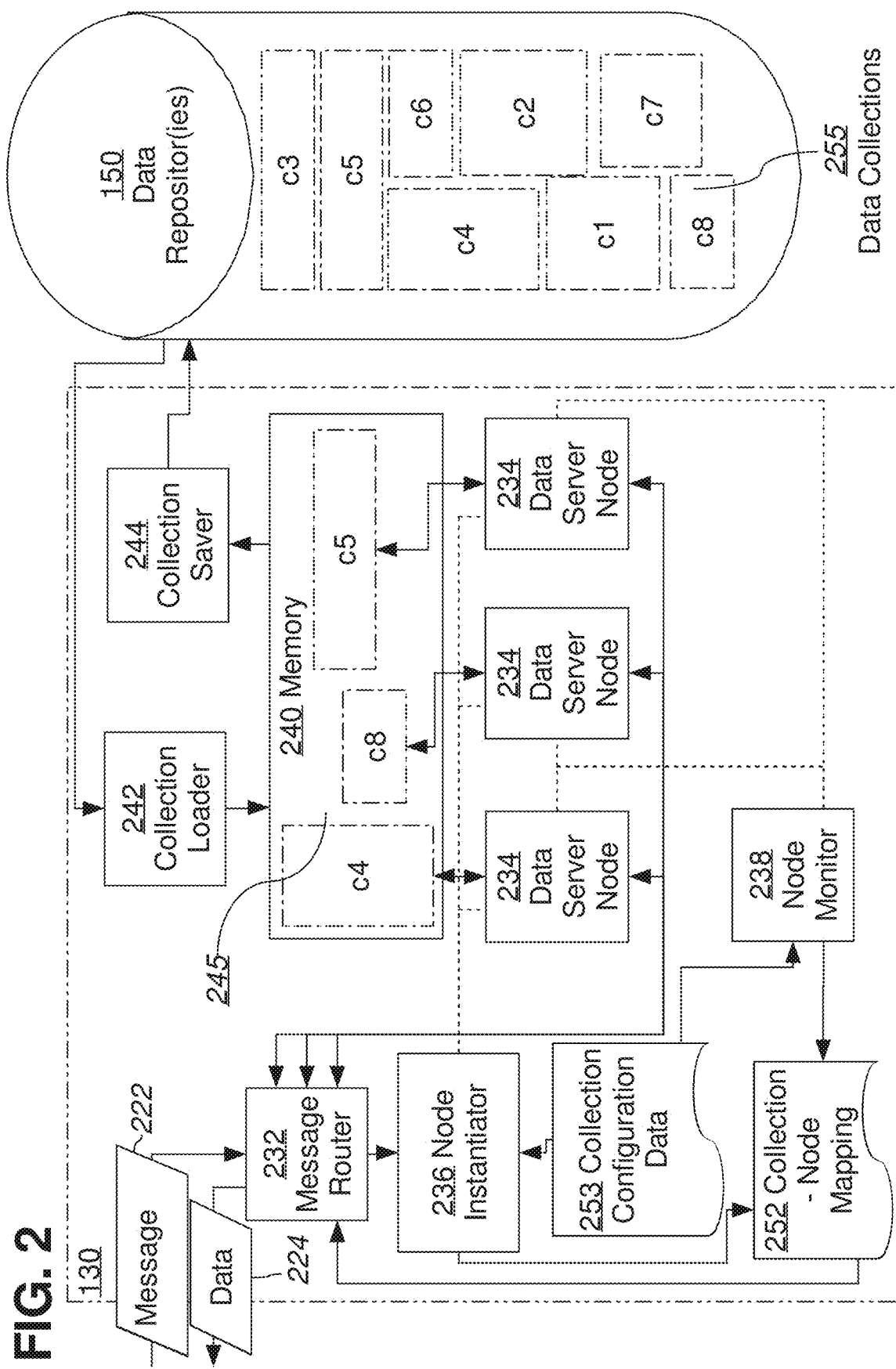
FIG. 2 illustrates an example data server system in which techniques described herein may be practiced.

FIG. 2 illustrates an example data server system 130 in which techniques described herein may be practiced, according to an embodiment. The various components of system 130 are implemented at least partially by hardware at one or more computing devices, such as one or more hardware processors executing instructions, stored in one or more computer-readable memories, for performing various functions described herein. In an embodiment, system 130 is a server computer system, comprising one or more server computer devices, such as data server devices 135, that collectively implement the various components of system 130 as a set of server-side processes. The server computer system may include, depending on the embodiment, application framework(s), web server(s), application server(s), and/or other conventional server components that the depicted components utilize to provide the described functionality.

System 130 utilizes data repository 150, implemented upon the one or more storage devices 155 depicted in FIG. 1. The data repository 150 comprises a plurality of data collections 255. Each data collection 255 may be a collection of data structures having a variety of forms, depending on the embodiment. For example, in an embodiment, each data collection comprises a collection of event data structures. In another embodiment, each data collection 255 comprises a group of lines of tab-delimited data. As further examples, in other embodiments, each of data collections 255 is a relational database, relational database table, set of eXtended Markup Language ("XML") elements, or one or more files. In yet other embodiments, data collections 255 may comprise data structures of any other suitable structure type. In an embodiment, different data collections 255 within the same repository 150 may support different data structure types. In an embodiment, a data collection 255 comprised of any of the foregoing data structures is augmented with system-defined and/or user-defined variables that can be updated to describe certain characteristics of the data stored in the data collection 255. Examples of such variables may include counters or metrics.

Each data collection 255 is associated with collection configuration data 253. Collection configuration data 253 may itself be stored in the data repository 150, or collection configuration data 253 may be stored outside of the data repository 253. Collection configuration data 253 describes various aspects of its associated collection 255, such as one or more identifiers for the collection 255, a number of fields found within the collection 255, a maximum collection size, and so forth.

In an embodiment, each data collection 255 is associated with a unique collection identifier that is assigned when the collection 255 is created. In an embodiment, the collection identifier is the name of a software application, or an application key assigned to a software applications or applications, for which the data collection is maintained. In an embodiment, the collection identifier is a name or other identifier for a user or user group. In an embodiment, any other suitable collection identifier is used. While only eight data collections 255 are depicted, data repository 150 may in fact comprise many more data collections.

In an embodiment, each data collection 255 is stored redundantly on multiple data storage devices 155, and synchronized there between. In an embodiment, each data collection is found on only some or even one of storage devices 155.

2.3. Data Server Nodes

Data server system 130 comprises data server nodes 234. Each data server node 234 is a set of one or more processes, executed by processors or other suitable components within data server system 130, that performs data operations with respect to one or more data collections 255, along with associated in-memory data structures that support the data operations. A data server node 234 is said to be assigned to the collection(s) 255 with respect to which it performs data operations. While only three data server nodes 234 are depicted, system 130 may comprise many more data server nodes 234. Each data server node 234 operates entirely on a single data server device 135, although a data server device 135 may execute any number of data server nodes 234, as resources permit.

A data server node 234 performs data operations in response to requests 222 received by data server system 130. Requests 222 may take any suitable form, depending on the embodiment. For instance, in an embodiment, requests 222 may be formatted as Hyper-Text Protocol ("HTTP") GET requests or POST requests. In another embodiment, requests 222 may take the form of statements in a query language such as Structured Query Language ("SQL"). Depending on the embodiment, a request 222 may command a data server node 234 to perform any type of data operation that is applicable to the data collection(s) 255 to which the data server node 234 is assigned, including without limitation those data operations described in other sections. In an embodiment, a request 222 may simply be a message, such as an event message or log message, that implicitly instructs the data server node 234 to process the message by performing one or more data operations with respect to data found within the message.

As a result of the performed operations, the data server node 234 may cause data within an assigned data collection 255 to be updated, and/or return response data 224 that comprises data retrieved from the assigned data collection 255 or derived based thereon. Response data 224 may be of any suitable structure, including without limitation the same structures in which the retrieved data is stored within the corresponding data collection 255, converted structures such as SQL result sets or XML documents, or derived structures such as web pages or images analyzing or visualizing the retrieved data. In an embodiment, certain returned structures in response data 224 are generated by applying the retrieved data to templates and/or formatting instructions.

System 130 comprises a collection-to-node mapping 252 that lists each existing data server node 234 within system 130 (e.g. by a combination of device address and port number, or any other suitable addressing scheme), along with identifier(s) for the data collection(s) 255 to which the data server node 234 is assigned. For each data collection 255, there is at any given point in time no more than one data server node 234 assigned to the collection 255. A data server node 234 remains assigned to the same collection(s) 255 until the data server node 234 is terminated. In an embodiment, each data server node 234 is assigned to only one of collections 255. In an embodiment, on account of other components described in other sections, there is not always an existing data server node 234 assigned to a given collection 255, even if a data server node 234 has previously performed operations with respect to the given collection 255.

In an embodiment, each data server node 234 executes in an isolated mode, meaning that each data server node 234 operates independently of other data server nodes 234, even if co-located on the same computing device. Thus, if one data server node 234 crashes, the remaining data server nodes 234 will be unaffected. In an embodiment, one technique for ensuring isolation is to execute each data server node 234 within a separate system runtime, although any other suitable isolation technique may be utilized.

In an embodiment, each data server node 234 is an instantiation of the same execution logic, meaning that each data server node 234 operates in essentially the same manner, but with respect to a different data collection. In other embodiments, some data server nodes 234 may execute different execution logic than other data server nodes 234. For instance, collection configuration data 253 may include parameters that impact how a data server node 234 processes a collection 255. As another example, system 130 may support different pre-defined types of data server nodes, each type supporting different data operation sets and/or outputting data in different manners. The type of data server node used for a collection 255 may be assigned, for instance, by collection configuration data 253. In an embodiment, configuration data 253 may specify that certain data server nodes 234 use certain data processing instructions for certain operations, while other data server nodes 234 utilize other data processing instructions for the certain operations. For instance, certain collections 255 may optionally be linked to files that contain custom instructions for processing certain types of commands.

2.4. Collection Loaders/Savers

As depicted, data server nodes 234 operate on working copies 245 of collections 255, instead of directly on collections 255. In an embodiment, each working copy 245 is a complete copy of its corresponding collection 255, although in other embodiments the working copy 245 may be of only a most recent segment of the corresponding collection 255. Data server system 130 comprises one or more collection loading components 242 that generate these working copies 245 as needed.

The working copies 245 are stored within memory 240, which is a collection of one or more memory components within the data server system 130. The one or more memory components are generally of higher speed than the storage devices 155 upon which data repository 150 is stored. The one or more memory components may be, for example, random access memories, flash memories, combinations thereof, and so forth. While often volatile, the one or more memory components may also or instead include non-volatile components. For convenience, any memory component that is on average faster in response time than the storage devices 155 at which data repository 150 is stored are referred to herein as "high-speed" or "higher-speed" memories. For systems 130 that are distributed amongst multiple data server devices 135, each data server node 234 will store its working cop(ies) 245 within components of memory 240 that are local to the data server device 135 upon which the data server node 234 executes.

The working copies 245 are, in an embodiment, stored within memory 240 for the entire lifetime of their respective data server nodes 234. Thus, collection loader 242 only needs to load the working copy 245 into memory 240 when the data server node 234 is first instantiated, regardless of how many operations the data server node 234 performs. Accordingly, any operation requested subsequent to instantiation of a data server node 234 benefits greatly from having a working copy 245 of the assigned data collection 255 already resident within memory 240.

Data server system 130 further comprises one or more collection saving components 244. In a process sometimes referred to herein as "dumping," collection saver 244 copies working copies 245 back to the repository 150 to ensure that the changes to working copies 245 are not lost if their corresponding data server nodes 234 crash or are terminated. In an embodiment, collection saver 244 operates asynchronously relative to data operations so as to ensure that the data operations are not required to wait for data to be copied back to the repository 150.

In an embodiment, collection saver 244 saves working copies 245 to repository 150 in response to detecting triggering conditions, such as detecting a certain number of changes and/or the elapsing of a certain amount of time. For instance, collection saver 244 may be configured to dump a working copy 245 every five minutes, or after every one hundred write operations. In an embodiment, the exact triggering conditions may vary from collection 255 to collection 255. An amount of time to wait before dumping a working copy 245 to repository 150 may be defined, for instance, in collection configuration data 253. In an embodiment, a collection saver 244 comprises a priority-based scheduling component, by which working copies 245 are assigned priorities based on factors such as number of changes, recency of changes, and application-specific weights. Collection saver 244 then dumps working collections based on their priorities, as resources permit. In an embodiment, collection saver 244 is configured to dump a working copy 245 before, or in response to, termination of a data server node 234 that is assigned to the corresponding collection 255.

In an embodiment, each data node 234 may comprise its own collection loader component 242 and/or collection saver component 244. In an embodiment, a single collection loader 242 and/or collection saver 244 may execute on each device 135 within data server system 130, and each data server node 234 may be configured to call the collection loader 242 and/or collection saver 244 as needed. In an embodiment, the collection saver 244 may be configured to monitor and optionally even maintain working copies 245 independently of their corresponding data server nodes 234.

In other embodiments, some or all of data server nodes 234 may instead be configured to perform operations with respect to a collection 255 without maintaining an in-memory working copy 245 of the collection 255. While, in some of these embodiments, portions of the collection 255 may still be loaded into memory 240, the portions will typically be loaded into memory 240 solely for the purpose of performing an operation, and may be removed from memory 240 at any time after the operation is concluded.

2.5. Message Routers

Data server system 130 further comprises one or more message routers 232. Message routers 232, comprise processes configured to distribute incoming requests 222 to different data server nodes 234. Each data server device 135 may comprise a message router component 232, or data server system 130 may comprise a single message router component 232 assigned to a single data server device 135 that is designated to handle all incoming requests 222.

A request 222 is initially directed to a message router 232, which then determines which of collections 255 is targeted by the request 222. For instance, request 222 may include a collection identifier for one of collections 255. Using collection-to-node mapping data 252, the message router 232 may determine which data server node 234 is assigned to the collection 255 identified by the identifier. The message router 232 may then forward the request to the corresponding data server node 234. In embodiments with multiple data server devices 135, a message router 232 may forward requests to data server nodes 234 on other devices 235.

In some embodiments, a data server node 234 sends any response data 224 back to the message router 232, which then forwards the response data 224 back to the original requestor. In other embodiments, a data server node 234 sends response data 224 directly back to original requestor.

In an embodiment, the message router 232 instead sends a new request to the assigned data server node 234. For instance, the message router 232 may be configured to translate an incoming message to a different protocol that is more efficient or otherwise desirable, and/or to generate specific data commands based on an incoming message. Similarly, a message router 232 may be configured to translate result data 224 into a response message in a more desirable response protocol, or even embed result data 224 in other data structures, such as web pages or documents.

2.6. Node Instantiation Components

As a consequence of various mechanisms described herein, a message router 232 may find that an incoming request 222 is targeted to a collection 255 that, according to collection-to-node mapping data 252, is not currently assigned to an existing data server node 234. Data server system 130 thus comprises one or more node instantiation components 236. When an incoming message 222 request or implies a data operation that is targeted to a collection 255 that is not currently assigned to an existing data server node 234, message router 232 instructs a node instantiation component 236 to instantiate a new data server node 234 for the targeted collection 255. Based on collection configuration data 253 associated with the targeted collection 255, node instantiation component 236 will create a new data server node 234 for the targeted collection 255, and update the collection-to-node mapping data 252 accordingly.

In an embodiment, each message router 232 comprises its own node instantiation component 236. In an embodiment, there is a separate node instantiation component 236 on each data server device 135 that is capable of hosting data server nodes 234. In an embodiment, the node instantiation component 236 monitors system resources in data server system 130, and/or accesses data supplied by node monitor 238, to determine where to instantiate a data server node 234. In other embodiments, node instantiation component 236 may determine where to instantiate a data server node 234 in part based on which data server device(s) 135 actually have access to and/or are assigned to data storage devices 155 that actually store the data collection(s) 255 to which the data server node 234 is assigned.

2.7. Node Monitors

Data server system 130 further comprises one or more node monitors 238. A node monitor 238 monitors existing data server nodes 234 to determine whether the data server nodes 234 are active or inactive. Node monitor 238 instructs or otherwise causes inactive data server nodes 234 to terminate. Node monitor 238 also updates the collection-to-node mapping 252 to remove any mappings to terminated data server nodes 234. In an embodiment, node monitor 238 further instructs or causes collection saver 244 to dump corresponding working copies 245 of the nodes 234 that are terminated, if necessary.

Depending on the embodiment, different criteria may be used to determine when a data server node 234 has become inactive. In an embodiment, for example, a data server node 234 becomes inactive when it has not received a request 222 within a certain period of time. Node monitor 238 may have access to request logs and/or may communicate with message routers 232 and/or data server nodes 234 to make this determination. The certain period may be of a global value, or the certain period may be set per collection 255 based on factors such as the importance of the collection 255, size of the collection 255, expected usage patterns, and so forth.

In an embodiment, the period of time is predefined in, for instance, the collection configuration data 253. In an embodiment, the period of time may be adjusted dynamically through various learning processes. For instance, if, within a relatively quick period of time after a data server node 234 for a certain collection 255 has been terminated, a new data server node 234 must be instantiated to operate on the certain collection 255, the learning process may adjust the predefined period to be longer. In an embodiment, the period of time after which a data server node 234 becomes inactive may be a function of how busy the data server system 130 is. Hence, under heavy server loads, a data server node 234 may become inactive more quickly than under lighter server loads.

In an embodiment, inactive data server nodes 234 are terminated immediately. In another embodiment, node monitor 238 maintains a prioritized queue of inactive data server nodes 234. When utilization of memory 240 reaches a certain threshold (e.g. a threshold amount or percentage), and/or when more room is needed in memory 240 for storing working copies 245 or other structures, node monitor 238 may select one or more of the inactive data server nodes 234 to terminate from the queue. The queue may be prioritized based on a variety of factors, such as for how long a data server node 234 has been inactive, usage trends for corresponding collections 255, working copy 245 sizes, predefined weights indicating how important each collection 255 is, and so forth. In such embodiments, if an inactive data server node 234 receives a new request 222, the data server node 234 becomes active and is removed from the queue. In an embodiment, once a node 234 is added to the queue, the node 234 may be instructed to dump its working copy 245 so that the node 234 may be terminated more quickly, if needed. In yet other embodiments, node monitor 238 maintains a prioritized list of active data server nodes 234, based on the above factors. When memory 240 is needed, a certain number of lowest priority data server nodes 234 are designated as inactive, and thus terminated.

In an embodiment, each data server node 234 comprises its own node monitor 238. Hence, each data server node 234 is configured to register itself in the collection-to-node mapping 252 and/or to terminate itself after a certain period of inactivity. In other embodiments, each message router 232 may comprise a node monitor 238. In yet other embodiments, there is a separate and distinct node monitor 238 per data server device 135, that monitors each data server node 234 on the data server device 135. In yet other embodiments, there is a single node monitor 238 that monitors each node 234 within data server system 130.

2.8. Variations

System 130 illustrates only one of many possible arrangements of components configured to provide the functionality described herein. Other arrangements may include fewer, additional, or different components, and the division of work between the components may vary depending on the arrangement. For example, in other embodiments, there may be no working copies 245, and hence no collection loader 242 or collection saver 244. In yet other embodiments, certain techniques described herein may be practiced in a data server system 130 that comprises no message router 232, node instantiation component 236, or node monitor 238. In fact, at least some of the techniques described herein may be practiced in substantially conventional data server systems.

3.0. Functional Overview

The techniques described in this section are performed by a system of one or more computing devices, such as data server system 130 depicted in FIG. 2 or other data server systems. In an embodiment, the techniques described in this section are performed by a system having features such as those described in U.S. patent application Ser. No. 14/046,767, titled "Multi-Lane Time Synced Visualization of Machine Data Events," by Cary Noel and John Coates, filed Oct. 4, 2013, the entire contents of which are hereby incorporated by reference for all purposes as if set forth herein. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Servicing Data Requests with Data Server Nodes

Figure 3:
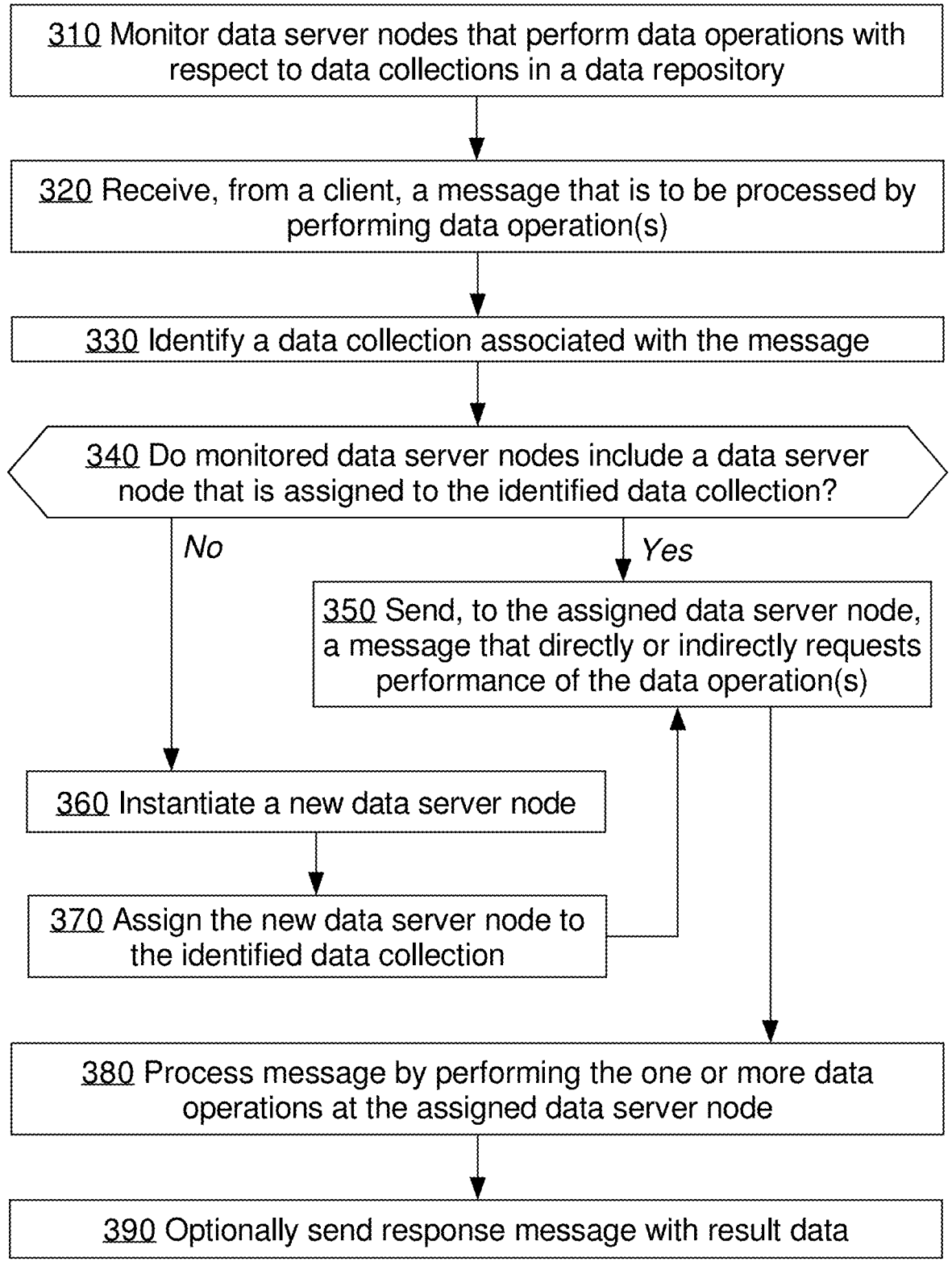
FIG. 3 illustrates an example process flow for processing messages with dynamically-instantiated data server nodes.

FIG. 3 illustrates an example process flow 300 for processing messages with dynamically instantiated data server nodes, according to an embodiment. Flow 300 illustrates only one example of a method for servicing data requests with dynamically instantiated nodes. Other flows may feature fewer or additional elements, in potentially varying orders.

Block 310 comprises monitoring data server nodes that perform data operations with respect to data collections in a data repository. The data operations may range from simple data insertion and retrieval operations, to complex operations such as filtering, joins, aggregations, statistical analyses, and/or formatting. The data server nodes include different nodes that are assigned to different collections of the data collections. The data collections may be any type of collection of data, as described in other sections. Examples of suitable data server nodes are also described in other sections. However, flow 300 may also be performed with respect to any type of data server node, and is not limited to any specific examples described herein. Block 310 may be performed at any number of times relative to the remaining blocks of flow 300, and in an embodiment is performed continually throughout the remainder of flow 300.

Block 320 comprises receiving, from a client, a message that is to be processed by performing one or more data operations. The message may have been sent from any type of client, such as from a web browser or other application over a network, or from a locally running process. The message may be any type of request that includes instructions that require performance of one or more data operations. For example, the message may be a data command that specifies a data operation, such as a query statement or other suitable instruction. Or, the message may simply imply a request to perform a data operation. For instance, the message may be an event message that, on account of how the data server system is configured, implicitly requires the data server system to record details about the event in a data collection and/or make other modifications to a data collection based on the event. As another example, the message may be a request for a web page or document that includes dynamic content that must be retrieved through one or more data operations.

Block 330 comprises identifying a data collection associated with the message. The data collection is associated with the message because the one or more data operations are to be performed with respect to the data collection. In an embodiment, the data collection is determined based on a collection identifier found in or associated with the message. For instance, the collection identifier may be appended as a parameter to the message, such as a parameter in a query string of an HTTP request. Or, as another example, the collection identifier may be found in or derived from metadata associated with the message. For instance, the collection identifier may be derived from HTTP header data such as a requestor address, referrer address, or user-agent string, or in an HTTP cookie. In an embodiment, a session identifier or user identifier associated with the message may be used to look up the collection identifier in server-side session data and/or user account data. In other embodiments, the data collection is discernable from a data command in the message. For instance, the data command may request data from a unique table, field, or database that is only found in a certain data collection. In an embodiment, a collection identifier is an application key that is assigned to a certain software application.

Block 340 comprises determining whether the monitored data server nodes include a data server node that is assigned to the identified data collection. For instance, as part of the monitoring in block 310, a map of collection identifiers to data server node identifiers may be maintained. If the map associates a collection identifier for the identified data collection with an identifier for an existing data server node, then it is determined that the existing data server node is currently assigned to the data collection.

If the determination of block 340 is that there is a data server node that is currently assigned to the data collection, then flow proceeds to block 350. Block 350 comprises sending, to the data server node assigned to the identified data collection, a message that directly or indirectly requests that the data server node perform the one or more data operations. Depending on the embodiment, the message may be the same as the message received in block 320, or the message may be different. For instance, the message sent in block 350 may be a binary representation or other converted representation of the message from block 320. Or, the message of block 350 may be a streamlined version of the message of block 320, removing extraneous metadata and/or other information. Or, if the message of block 320 implied rather than specified a data operation, the message of block 350 may actually specify the data operation(s) to perform.

If, on the other hand, the determination of block 340 is that none of the monitored data server nodes is assigned to the data collection, then flow proceeds to block 360. Block 360 comprises instantiating a new data server node. Instantiating a new data server node may comprise, for instance, loading instructions for listening for messages such as sent in block 350, and performing data operations based thereon. Instantiating a new data server node may further comprise, for instance, loading configuration data associated with the data collection. Instantiating a new data server node may further comprise, for instance, launching one or more computer processes or threads that execute the loaded instructions based on the configuration data. Instantiating a new data server node may further comprise, for instance, allocating portions of volatile or otherwise high-speed system memory to store data structures required by the loaded instructions.

Flow then proceeds to block 370, which comprises assigning the new data server node to the identified data collection. For instance, block 370 may comprise updating a map of collection identifiers to data server nodes to include a mapping between the new data server node and the identified collection. In an embodiment, block 370 may further comprise the new data server node loading some or all of the data collection from a slower storage device into the allocated portions of the higher speed memory. From block 370, flow then proceeds to block 350, since there is now a data server node that is assigned to the data collection.

From block 350, flow proceeds to block 380. Block 380 comprises processing the message, thus resulting in the performance of the one or more data operations at the assigned data server node. For instance, if the message contains database commands or otherwise references the data operations to perform, the data operations are performed as instructed. Or, if the message comprises data structures such as events or logs, the appropriate data operations for processing those events or logs are executed. The data operations may be performed in any suitable manner. In an embodiment, block 380 may comprise loading instructions for performing certain types of data operations from various script files, or in-memory copies thereof. In other embodiments, instructions for performing certain types of data operations are hard-coded into the instructions based upon which the data server node was instantiated. If the data collection has been loaded into system memory, the data operations are performed directly on the in-memory data structures. Otherwise, block 380 may involve retrieving some or all of the data collection from storage.

Block 390 optionally comprises, responsive to performing the one or more data operations, sending the client a response message with results from the one or more data operations. The data server node may send the response message directly, or via a message distribution component from which it received the message of block 350.

In an embodiment, flow 300 is repeated any number of times. If a second message is received in association with a data collection for which a server node was instantiated in block 360 of a previous iteration of flow 300, the second message will also be processed by that server node, assuming the server node still exists. Thus, block 360-370 often need not be performed for the subsequent iterations of flow 300 that involve a same data collection. Multiple iterations of flow 300 may furthermore be performed concurrently with respect to different data server nodes assigned to different data collections, such that certain messages are distributed to already existing data server nodes at the same time as new data server nodes are being created for other messages.

3.2. Reclaiming Resources from Inactive Nodes

Figure 4:
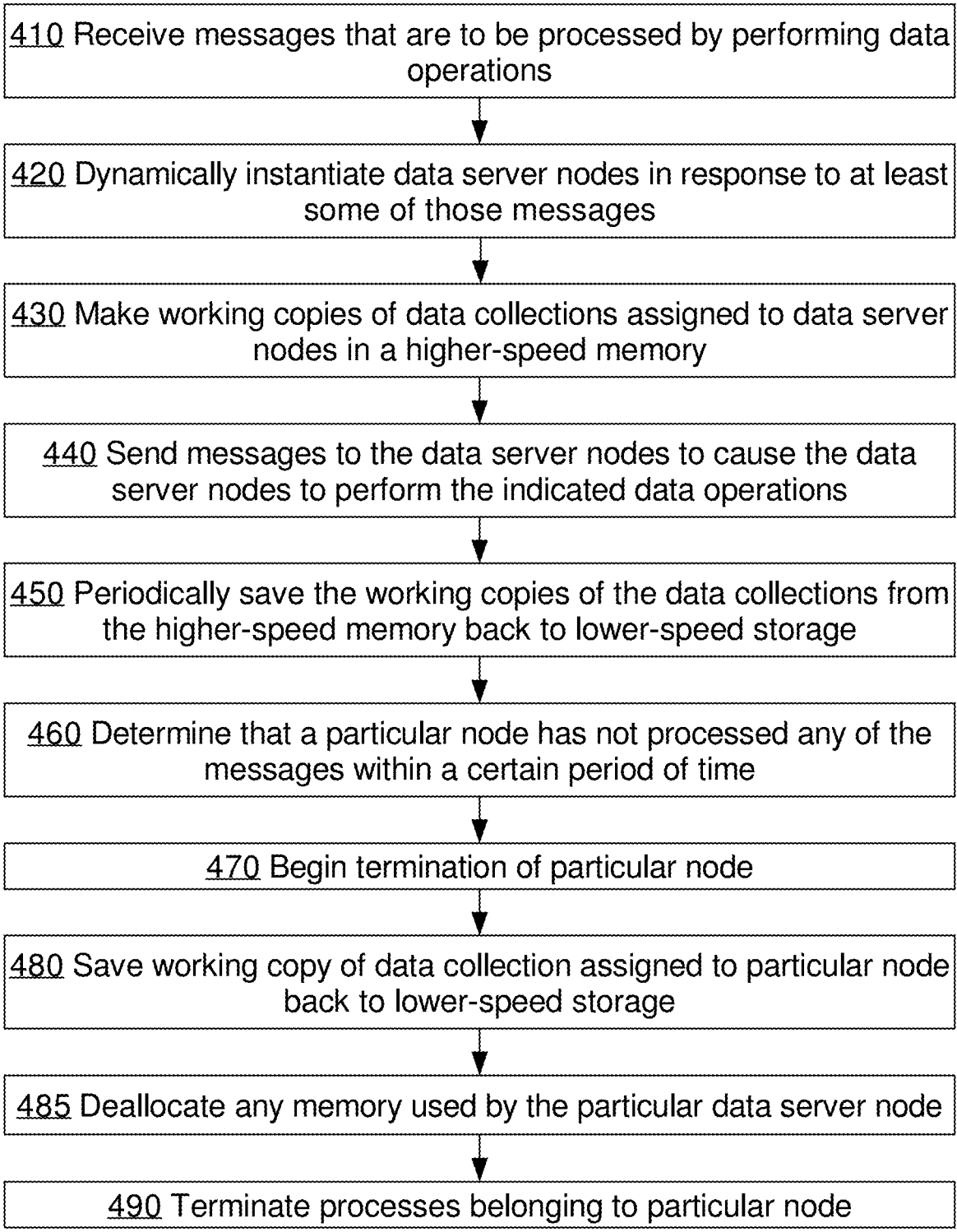
FIG. 4 illustrates an example process flow for reclaiming resources from inactive nodes in a data server system.

FIG. 4 illustrates an example process flow 400 for reclaiming resources from inactive nodes in a data server system, according to an embodiment. Flow 400 illustrates only one example of a method for reclaiming resources from inactive nodes in a data server system. Other flows may feature fewer or additional elements, in potentially varying order. Flow 400 may, but need not necessarily, be performed in a data server system that performs flow 300. Similarly, flow 300 need not necessarily be performed in a data server system that performs flow 400.

Block 410 comprises receiving messages that are to be processed by performing data operations, as would occur in, among other contexts, multiple iterations of block 320. Block 420 comprises dynamically instantiating different data server nodes for different data collections in a data repository in response to at least some of those messages, as would occur in, among other contexts, multiple iterations of blocks 340-370 above.

Block 430, which is optional, comprises copying data collections assigned to the data server nodes from a lower-speed storage on which they are persistently stored to a higher-speed memory, thus forming a working copy of the data collections in the higher-speed memory, as described in other sections. Block 440 comprises sending messages to the data server nodes to cause the data server nodes to perform the data operations indicated by the messages of block 410, as would occur in, among other contexts, multiple iterations of block 350 above.

While, for simplification, blocks 410-440 are described with respect to elements of flow 300 above, it should be noted that performance of blocks 410-440 is not limited to the embodiments described with respect to flow 300, but rather may be performed in any suitable manner.

Block 450, which is optional, comprises periodically, or in response to certain triggers, saving (i.e. "dumping") the working copies of the data collections from the higher-speed memory back to the lower-speed storage. Thus, changes to the working copies are synchronized back to the data repository. Block 450 is, of course, not performed if no working copy is maintained for a data collection. Block 450 is optional if a working copy will be saved in block 480 below. Block 450 may be performed multiple times for each data collection—for instance at intervals of five minutes or an hour. The exact interval may be different for each collection, based on collection-specific configuration data. The interval may be a function of a variety of factors, as described in other sections. Additionally, or instead, block 450 may be performed responsive to certain types of triggers, such as the occurrence of certain types and/or quantities of changes, as described in other sections.

In an embodiment, the entire working copy is dumped. In other embodiments, only a most recent segment of the working copy is dumped. For instance, the data collection may be a collection of time-based events, segmented by the time periods in which the events are received. Under many usage patterns, only the most recent data collection segment(s) include any changes, and thus only the most recent segment(s) need to be synchronized back to the repository.

Block 460 comprises determining that a particular data server node, of the dynamically instantiated data server nodes, has not processed any of the messages within a certain period of time. For instance, a component responsible for distributing messages to the node, such as message router 232, may log the times at which it last sent one of the messages of block 450 to each of the data server nodes. Based thereon, the message distribution component may periodically, or in response to certain triggers, identify all nodes that have not processed one of the messages of block 450 within the certain period of time.

As another example, one or more system monitoring components, separate from any message distribution component, may monitor activity at the data server nodes. Based on logs kept by message distribution component(s) and/or the data server nodes, or based on messages exchanged with the distribution component(s) and/or the data server nodes, the one or more system monitoring components may identify when each node last processed one of the messages of block 450, and thus determine whether the nodes have processed any of the messages within a certain period of time. In yet another embodiment, data server nodes may run their own processes or threads that perform block 460 in similar manner.

In an embodiment, the certain period of time may be predefined for all nodes specified in node-specific configuration data. In an embodiment, the certain period of time is a function one or more parameters, such as server load, a target amount of memory to reallocate, a time of day, statistics derived from previous node-specific and/or global message histories, node-specific weights, and so forth. In an embodiment, the certain period of time is a threshold determined based on how long it has been since each of the other data server nodes processed one of the messages of block 450. For instance, the certain period of time may be chosen such that only a specific number of nodes are determined to not have processed one of the messages of within the certain period of time.

In an embodiment, instead of actually determining whether a node has processed a message within a certain period of time, a priority score is assigned to each data server node based on the amount of time since the node processed one of the messages of block 450, a node-specific inactivity timeout, and/or other parameters such as described above. Instead of determining that the particular data server node has not processed a message within a certain period of time, block 460 may comprise determining that the particular data server node has a priority score above (or below) a threshold, or that the particular data server node has a priority score that is higher (or lower) than other data server nodes.

In an embodiment, block 460 may further comprise determining that the particular data server node is inactive and/or not still performing a data operation, per criteria such as explained in this and other sections. In an embodiment, instead of determining whether a node has processed any messages within a certain period of time, block 460 may instead comprise determining whether the node has begun and/or completed any data operations within the certain period of time, as may be revealed by, for instance, operation logs maintained by each data server node.

Block 470 comprises, responsive to the determination(s) of block 460, beginning termination of the particular data server node. For instance, if block 460 is performed by a message distribution component or system monitoring component, the message distribution component or system monitoring component may send a termination message to the particular data server node. Or, the message distribution component or system monitoring component may instruct an operating system process management component or similar component to terminate the processes and/or threads executed by the particular data server node.

Block 480, which is optional depending on the embodiment, comprises dumping a working copy of the data collection(s) associated with the data server node from high-speed memory to lower-speed storage media at which the data collections are persistently stored. Of course, block 480 need not be performed in embodiments where working copies are not maintained. In an embodiment, block 480 may not be performed even when working copies are maintained. For instance, in systems where some data loss is acceptable, the system implementer may decide that under some or all circumstances, it is more important to immediately free up the high-speed memory than to preserve any changes that have occurred since the data collection was last saved to the lower-speed storage media.

In an embodiment, block 480 is performed by the data server node directly. In other embodiments, block 480 is performed by an external collection saving component upon request by the data server node or another component that has instructed the data server node to terminate. In yet other embodiments, block 480 is performed responsive to an external collection saving component determining, via triggers and/or monitoring processes, that termination of the particular data server node has begun and/or has already occurred.

In some embodiments, block 480 is not necessary if it can be determined that the working copy has not been changed since the working copy was loaded and/or last copied back to the storage media. For instance, there may be a "dirty" indicator for each data collection working copy. If the "dirty" indicator is set, block 480 is performed. A "dirty" indicator is initially unset when the corresponding data collection is loaded and whenever the corresponding data collection is saved. Whenever a data server node performs an operation that changes a working copy, the corresponding "dirty" indicator is set. Alternatively, rather than maintaining an actual indicator, an indication of whether a working copy is "dirty" may be derived by comparing a timestamp that reflects when the working copy was last modified to a timestamp that reflects when the data collection was last modified and/or when the working copy was last loaded. The same principle applies to the optional periodic dumping process described in block 450.

Block 485 comprises deallocating any memory used by the particular data server node, including any memory used to store working copies. Block 485 should be performed after block 480 has concluded, at least with respect to the portions of the memory that are used to store the working copy. In an embodiment, block 485 may be performed at least partially by the data server node. In an embodiment, block 485 may be performed at least partially by an operating system or runtime memory management component. In some embodiments, depending on how the working copies assigned to the particular data server node are managed, deallocation of the memory portions that store the working copy may instead be performed by an external collection saving component.

Block 490 comprises terminating the particular data server node. In some embodiments, block 490 may be completed before block 480 has concluded, if an external component is capable of managing and saving the working copy. The particular data server node may shut down its processes and/or threads gracefully, or the processes and/or threads may be forcefully terminated by the operating system or system runtime.

Flow 400 may be repeated any number of times. For instance, after the particular data server node has terminated, a new message indicating a data operation to perform with respect to a particular data collection that had been assigned to the particular data server node may be received. A new data server node may then be instantiated for the particular data collection. That new data server node might also at some point be terminated in accordance with flow 400. Multiple iterations of flow 400 may furthermore be performed concurrently, such that, for example, multiple data server nodes are being terminated at the same time that messages are being distributed to other data server nodes.

3.3. Utilizing Time Contexts

FIG. 5 illustrates an example process flow 500 for utilizing a construct that defines a time context in which a data server system should operate, according to an embodiment. Flow 500 illustrates only one example of a method for utilizing a construct that defines a time context. Other flows may feature fewer or additional elements, in potentially varying order. Among other aspects, such a construct may provide developers with a convenient and simplified mechanism for creating and subsequently updating time-sensitive data structures, such as counters, variables to record various statistics, and/or other records. Such a construct may also provide developers with convenient and simplified access to time-sensitive data. Flow 500 may be performed in any data server system that operates on time-based data, regardless of whether those data server systems also perform the techniques described with respect to FIG. 3 and FIG. 4.

Block 510 comprises receiving a construct that indicates that the data server system is to establish a time context. The construct may be received via any suitable interface, such as a command line interface or an API. In an embodiment, the construct is a statement within a script or other set of computer-readable instructions. The construct includes or is otherwise associated with a parameter that defines an arbitrary period of time for which the time context should be established. For instance, the construct may define a range of timestamps. Specific examples of such constructs are given, without limitation, in other sections.

In an embodiment, the data server system is configured to recognize pre-defined values within the parameter for defining the time period, such as "day," "week," or "month." The data server system automatically determines a time or range of times for the time context based on an algorithm associated with the pre-defined value. For instance, by specifying a time context of a "day," a user may in essence specify to the data server system that the time period is a range of timestamps beginning at the start of the current day. In an embodiment, certain pre-defined values such as "day" are relative to the current system time, so that processing the same construct results in establishing a different time context depending on when the construct is processed.

In an embodiment, a second parameter may specify that the time period for the time context is actually a certain number of time periods prior to the time period defined by the first parameter. For instance, the first parameter value may be "month" and the second parameter value may be "−3." Accordingly, the data server system will establish a time context of three months ago.

Block 520 comprises receiving a first instruction, within the time context, that specifies a first operation to perform with respect to a first set of data. The first instruction may specify, for instance, to retrieve data, perform a calculation, or generate a view. The set of data may be, for instance, a set of events, a group of data rows, a data collection as set forth herein, or any other suitable set of data. The first instruction need not specify the time context again, nor need the first instruction specify any time-based filter. Rather, the first instruction is received in such a manner that the data server system recognizes that it belongs to the established time context.

For instance, the construct of block 510 may be specified in a certain script or other set of instructions. The first instruction may also be specified in the instruction set, at some point following the construct of block 510, without any intervening constructs that specify a new time context or that terminate the established time context. As another example, the first instruction may appear in an indented block of instructions following the construct. As another example, the first instruction may be received in a same communication session or command line session as the construct of block 510, again without any intervening constructs that specify a new time context or that terminate the established time context.

Block 530 comprises, responsive to the first instruction, performing the first operation with respect to only those items (e.g. rows, events, objects, etc.), in the first set of data, that are associated with timestamps that occur within the time period defined for the time context. In an embodiment, a data item is determined to be associated with a time that occurs within the defined time period if the value of a designated column, field, or other parameter is a timestamp within the defined time period. However, other types of associations are possible.

In an embodiment, block 530 comprises retrieving only the relevant data items. In another embodiment, if the first set of data has already been retrieved, block 530 comprises filtering the first set of data to include only the relevant data items. For certain types of data sets that are already sorted, the filtering may be a relatively straightforward segmentation operation. In an embodiment, the first set of data is already partitioned into time-based segments, thus allowing the data server system to easily retrieve or filter some or all of the first set of data on a segment-by-segment basis.

In an embodiment, the relevant data may already have been filtered or retrieved at a time prior to block 520. For example, in an embodiment, each data server node processes only one data collection. Thus, the first data set is known to be the data collection assigned to the data server node, and may be filtered to the time context as soon as the construct of block 510 is recognized. As another example, another construct may define a data context, which specifies that all following instructions are to be performed with respect to the first data set. The data context construct may have been received prior to block 520 or even prior to block 510. Responsive to having received both the data context construct and the time context construct, the data server system may automatically retrieve and/or generate a filtered data set.

Block 540 comprises optionally creating or updating a time context variable to store a calculation that results from block 530, as necessary. For instance, block 540 may comprise creating a counter variable. The counter variable is automatically created within the time context. The counter variable may be stored permanently within a corresponding collection. If the time context is ever entered again (e.g. when processing a message in the future), the variable may be accessed simply by referring to the variable by name. However, in other time contexts, the variable name refers to an entirely different variable. In an embodiment, the variable may be accessed outside of the time context by referencing a combination of the variable name and a time context identifier.

In an embodiment, blocks 530-540 may be repeated any number of times before block 550, and then again any number of times after block 580 but before block 590. Thus, for instance, the data server system may process multiple instructions to perform multiple operations within the time context, without the user having to repeatedly specify the time context.

Blocks 550-580 are optional. Block 550 comprises receiving an embedded time construct that defines an embedded time context. The embedded time construct is similar to that described with respect to block 510, except that it does not terminate the time context established as a result of block 510 (the "original time context"), but rather simply suspends the time context while an embedded time context is established. The embedded time context is associated with a different time period than is the original time context.

Block 560, comprises receiving a second instruction, within the embedded time context, that specifies a second operation to perform with respect to the first set of data, in similar manner to block 520. Block 570 comprises, responsive to the second instruction, performing the second operation with respect to only those items, in the first set of data, that are associated with timestamps that occur within the time period defined for the embedded time context, in similar manner to block 530. Hence, the second operation is performed on a different set of filtered data from the first set of data than the first operation.

Block 580 comprises receiving a construct that terminates the embedded time context. Thus, the data server system terminates the embedded time context and resumes the original time context. The construct may be any suitable construct designated for terminating a time context.

Block 590 comprises receiving a construct that terminates the original time context. Thus, the data server system terminates the original time context. Again, the construct may be any suitable construct designated for terminating a time context. Or, in an embodiment, the terminating construct may be another time context construct, thus returning flow back to block 510.

4.0. Example Data Server Node

Figure 6:
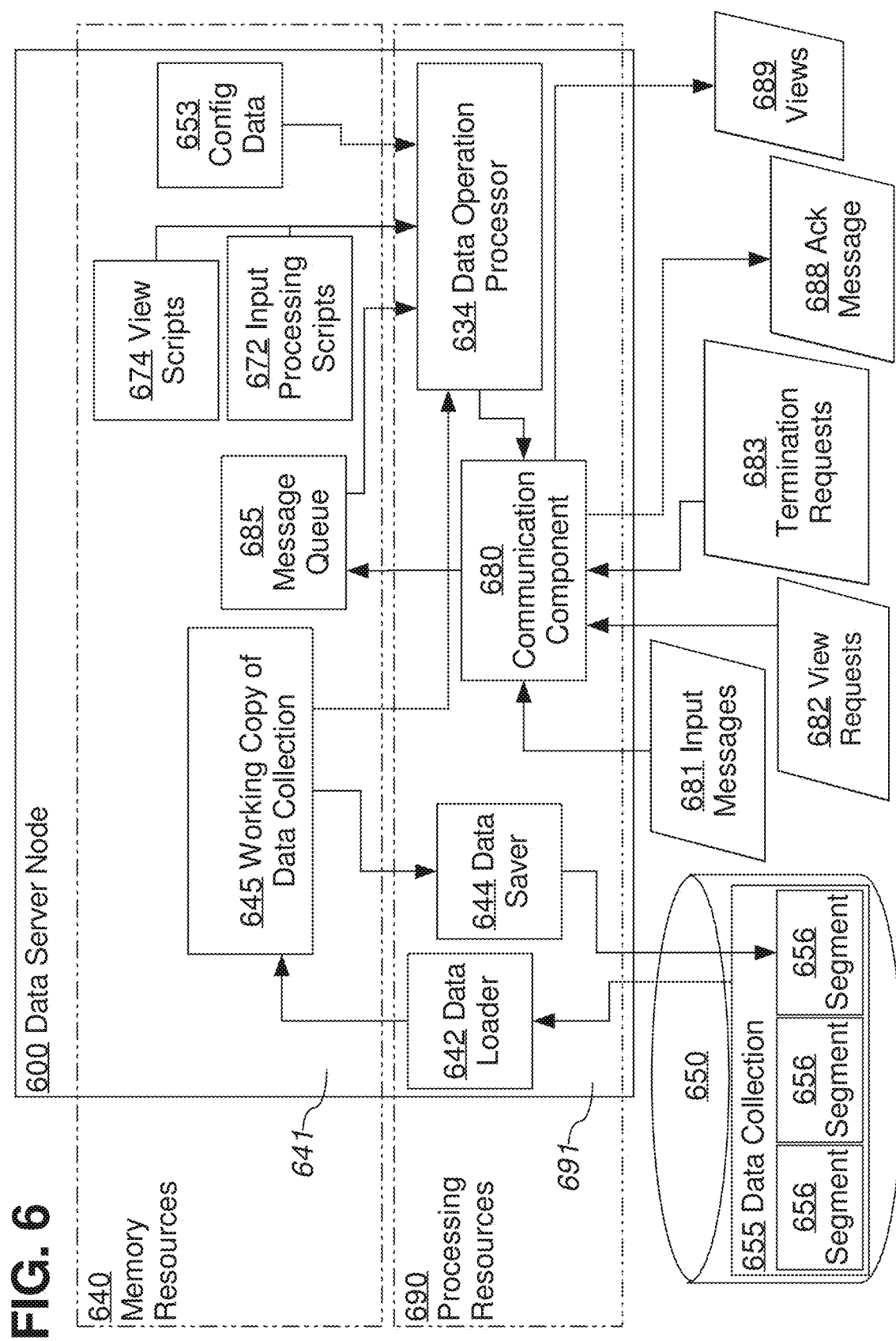
FIG. 6 illustrates an example data server node.

FIG. 6 illustrates an example data server node 600, according to an embodiment.

Data server node 600 is associated with a data collection 655, which is persistently stored in non-volatile storage 650. For instance, data collection 655 may be an example of data collections 255 from FIG. 2, while data server node 600 may be an example of data server nodes 234 from FIG. 2.

In an embodiment, data collection 655 is a collection of time-based events. In an embodiment, collection 655 is furthermore constrained in size. For instance, collection 655 may only store events for a most recent period of time, only a certain number of events, and/or only a certain size of data. To this end, node 600 or an external process may monitor collection 655 and delete old events as needed. In yet other embodiments, collection 655 may take any form, and is not necessarily constrained in size.

In an embodiment, data collection 655 is stored as a series of segments 656. Segments 656 may be, for example, files, partitions, directories, or any other suitable structure for containing data lines, events, rows, or other items. In an embodiment, each segment 656 corresponds to a distinct period of time. For instance, in an embodiment, each segment 656 corresponds to a different hour of time, and contains items that were added to the collection 655 during the corresponding hour of time. Each segment 656 is stored as a separate file within a directory named after the collection 655, and each file is named after the hour for which it was created. In other embodiments, other segmentation schemes may be utilized. In yet other embodiments, there are no segments 656.

Data server node 600 comprises processing components such as components 634, 642, 644, and 680. These processing components may be, for instance, threads and/or processes executing using certain processing resources 691, of system processing resources 690. In an embodiment, the processing components of node 600 run within an isolated environment, such as an Erlang C-Node. In other embodiments, the threads and/or processes used by node 600 may be any arbitrary group of threads and/or processes. In an embodiment, the processing resources 691 utilized by each node 600 include, for each node 600, a different set of one or more processors or processor cores in system processing resources 690. However, such a configuration is not essential.

Data server node 600 further comprises in-memory components such as components 645, 653, 672, 674, and 685, implemented upon an allocated portion 641 of memory resources 640. For instance, memory resources 640 may be random access memories, or any other memory components, such as described with respect to memory 240 of FIG. 2. A portion 641 of memory 640 is allocated to node 600 when node 600 is instantiated and/or at the request of processing components in node 600. Each of the in-memory components is a data structure within the allocated portion of memory 641, to or from which the processing components of node 600 may write or read data as needed for performing the functions described herein. Depending on the embodiment, the allocated portion 641 may change in size over time, according to the needs of the node 600.

Data server node 600 operates in accordance with configuration settings 653. Configuration settings 653 may be loaded from a configuration file associated with collection 655. In an embodiment, the configuration settings are part of configuration data 253 from FIG. 2. In an embodiment, the configuration settings 653 include some or all of: the name of the collection 655 assigned to the node 600, the maximum number of counters that may be hosted by the collection 655, the maximum number of data segments that the collection 655 may store, the maximum number of unique items each of those segments can store, a time period after which the node 600 becomes inactive, a time period after which the node 600 should dump its working copy 645, and so forth.

Data loading component 642 is configured to load data collection 655 into the allocated portion 641 of memory 640, thereby storing working copy 645 of collection 655. Depending on the embodiment, data loader 642 may load only the most recent segment(s) 656, or all segments 656. In an embodiment, data loader 642 is called upon instantiating the node 600.

Communication component 680 monitors one or more communication channels, such as ports, for messages such as messages 681-683. For instance, communication component 680 may be an Erlang port driver or other suitable mechanism for receiving and responding to communications over a communications interface. Messages may be received in any suitable format. In an embodiment, for instance, a message distribution component such as message router 232, receives a request to perform data operations as a parameterized URL within an HTTP requests. The message distribution component translates the requests into binary-encoded messages, and sends binary-encoded messages to the communication component 680 of the node 600 assigned to handle the request. Of course, many other forms of messages are possible.

Communication component 680 may receive, among other messages, input messages 681. Input messages 681 specify data item(s), such as events or rows, that are to be inserted into the collection 655. In response, communication component 680 adds the input messages 681 to a message queue 685, and sends an acknowledgement message 688 to the message distribution component and/or original requester. Communication component 680 may further receive, among other messages, view requests 682. View requests 682 specify data to be returned from the data collection 655. In response, communication component 680 adds the view requests 682 to the message queue 685. After data operation processor 634 has generated a specified view, communication component 680 sends a view message 689 containing the view to the message distribution component and/or original requester.

Depending on the embodiment, message queue 685 may be a simple first-in-first-out queue, or message queue 685 may be organized according to a prioritization mechanism that gives priority to certain messages 681 or 682 based at least on one or more factors other than when the messages 681 or 682 were received. For instance, messages 682 may be prioritized ahead of messages 681, or messages 682 from certain clients may be prioritized higher than all other messages. In any event, data operation processor 634 monitors message queue 685. Whenever there are messages in message queue 685, and whenever sufficient processing resources 690 and/or memory resources 640 are available, data operation processor 634 pops the highest priority message 681 or 682 from the queue 685 and performs the data operation(s) indicated by the message 681 or 682.

For messages 681, data operation processing component 634 utilizes input processing instructions 672 to create a new data item. Depending on the data in a message 681, the input processing instructions 672 for creating a new data item may be relatively straightforward, in that the data in the message 681 is simply copied to new data item. Or, the input processing instructions 672 may need to instruct data operation processor 634 in applying semantics to the data in the message 681, performing calculations based thereon, and/or determining how to create or update counters or other elements within the collection 255. Data operation processor 634 then saves the new data item to the working copy 645 of collection 655, or more particularly to the currently active segment 646 in the working copy 645. Asynchronously, a data saver component 644 dumps the working copy 645, or at least the currently active segment 646, back to the collection 655 in storage 650, as described in other sections.

For messages 682, data operation processor 634 utilizes view processing instructions 674 to determine what data is required for the specified view. View processing instructions 674 may, depending on the view, instruct data operation processor 634 to do any or all of: assign semantics to the data, identify which data from working copy 645 to process based on the semantics, filter the data by based on filtering criteria specified in the request 682, perform aggregations or calculations based on the data, arrange the data into tables or other structures defined for the requested view, generate visualizations based on the data, or perform any other data processing tasks. Data operation processor 634 then generates and returns the requested view.

In an embodiment, input processing instructions 672 and view processing instructions 674 are hard-coded into the execution logic for running the data operation processing component 634. In other embodiments, input processing instructions 672 and view processing instructions 674 are encapsulated in flexible script files, such as in the example scripting language described in other sections. For instance, a script interpreter within the data operations processor 634 may process input messages 681 with a "process.lql" script that is loaded from a script file. The "process.lql" script gives semantics to the data found in the message 681, creates and/or updates counters based on the message 681, creates the data item to insert, and saves the new data item to the working copy 645. As another example, there may be separate view script files for different named views. When a particular view is requested, the script interpreter loads the view script file having the requested view name, and creates the view based on the instructions within the view script file. In an embodiment, view script files are easily added to a data server system, allowing analysts to create and define new views as needed. In an embodiment, different script files may be stored for different collections 655, and/or there may be a default set of script files.

In an embodiment, communication component 680 further receives termination requests 683 from, for instance, a message distribution component or an external node monitoring component. In response, node 600 gracefully and atomically stops. Before stopping, however, data saver component 644 saves working copy 645 back to collection 655. The processes and threads that utilize processing resources 691 cease to exist, and the allocated memory 641 is freed for use by other applications.

FIG. 6 illustrates only one of many possible arrangements of a data server node. Other arrangements may include fewer, additional, or different components, and the division of work between the components may vary depending on the arrangement. For example, in an embodiment, node 600 further comprises an auxiliary service component configured to save all data in messages 681 in a raw input log, without additional processing, so that the requests may be archived and/or processed by a separate application. As another example, communication component 680 does not receive termination requests 683, and node 600 optionally monitors itself to determine when to terminate. A number of other variations on the depicted data server node are also possible.

5.0. Example Data Processing Instructions

According to an embodiment, as previously stated, the instructions used by a data server system for performing data operations may be provided in script-based files that conform to scripting languages. A data server system may access different files to perform different operations. For example, as stated, a "process.lql" file may contain instructions for processing incoming events, log messages, or other request messages. That is, every time a message is received, the "process.lql" file, with the message loaded into a designated input parameter for the script. Similarly, each view provided by the data server system may be defined by a script-based file. For example, the name of the requested view may correspond to the name of a ".lql" file. In an embodiment, the files are interpreted at execution time, rather than compiled, and thus may be changed dynamically, without having to restart the data server system.

Although the exact format of the scripting language may vary from embodiment to embodiment, in one embodiment, an example scripting language supports instructions such as set forth in following examples. As depicted, the scripting language is a Scheme-based (Lisp-1) language without macros.

Table 1 depicts an instruction for creating and/or updating a counter named "datalines" to store a count of all items within a collection.

TABLE 1

(incdb "datalines" 1)

Table 2 depicts a set of instructions that parses each item in a data collection, extracts different pieces of information, assigns those pieces of information to different fields, and then stores a "user-ids" variable reflecting the number of unique users

TABLE 2

```
(define (pre-process string-row)
(let ((row (reverse (string-split (str string-row) ":"))))
(if (= (length row) 9)
(let ((ver (nth row 0))
(tag (nth row 1))
(phone-model (nth row 2))
(manufacturer (nth row 3))
(os-ver (nth row 4))
(app-ver (nth row 5))
(country (nth row 6))
(timestamp (nth row 7))
(uuid (nth row 8)))
#f)))
(add-unique "user-ids" uuid)
```

Table 3 depicts a set of instructions that establish a time context and create a counter within the time context. As depicted, the name of the construct that establishes the time context is "timespace." The counter will store a count of all items within the collection that are received in the current day.

TABLE 3

(timespace "day")
(incdb "datalines" 1)

Table 4 depicts a set of instructions that creates and stores two counters: one daily counter and one monthly counter.

TABLE 4

(timespace "day")
(incdb "datalines" 1)
(timespace "month")
(incdb "datalines" 1)

While the instructions appear to only specify one "datalines" counter, the two "timespace" constructs actually establish two different time contexts, and a separate datalines counter is maintained for each time context. Internally, for example, each counter may have a prefix of "datalines," followed by a name derived from the context, such as "datalines_January2013." When the script is first processed in a new time period (i.e. when a new day and/or new month begins), based on the time contexts in which the instructions of Table 4 are processed, a new counter will automatically be created for the new time period. Thus, processing incoming messages with the above script over time will result in separate counter variables for each day and each month in which a message is received.

Table 5 depicts a set of instructions that accesses a counter in a non-current time period. The "timewarp" construct permits access to a previous time period, and includes a parameter to specify an offset from the current time period in which to establish the time context. In the depicted example, the time context is one day ago.

TABLE 5

(timewarp "day" −1)
(incdb "datalines" 1)

Table 6 depicts a set of instructions that establishes an embedded time context within another time context. The initial "timespace" construct establishes a time context within the current day. The "timebubble" construct instructs the data server system to temporarily suspend the original timespace construct, in favor of the non-current time context specified by the immediately following "timewarp" construct.

TABLE 6

(timespace "day")
(timebubble
(timewarp "day" −1)
(incdb "datalines" 1))
(incdb "datalines" 1)

Table 7 depicts a set of instructions that parses incoming messages into various fields of data, and then, for messages that are "tagged" as erroneous, creates or updates daily counters for tabulating how many unique errors occurred and how many users were affected from these errors.

TABLE 7

```
(define string-row *stream*)
(let ((row (reverse
(string-split (str string-row) ":"))))
(if (= (length row) 9)
(let ((ver (nth row 0))
(tag (nth row 1))
(phone-model (nth row 2))
(manufacturer (nth row 3))
(os-ver (nth row 4))
(app-ver (nth row 5))
(locale (nth row 6))
(timestamp (nth row 7))
(uuid (nth row 8)))
(timespace "day")
(if (contains? tag "_crash")
(let ((error-id (nth (string-split tag "—") 0)))
(error-affects error-id uuid)
(calc-unique-error error-id)
(incdb "error_sessions" 1))
(begin
(calc-unique-user uuid)
(user-is-back uuid)
(calc-app-version uuid app-ver)
(calc-os-version uuid os-ver)
(calc-phone-model uuid phone-model)
(if (eq? "_ping" tag)
(incdb "sessions" 1)
))))))
```

The foregoing scripts are given by way of example of the types of operations that may be supported by the example scripting language and/or by performing data operations based on script-based files in general. There are of course many other types of operations that may be performed, and many different languages and arrangements of instructions suitable for instructing a data server system to perform those operations. Moreover, in embodiments, a data server system need not necessarily support the types of constructs and data operations found in the foregoing scripts.

6.0. Example User Interfaces

FIG. 7-FIG. 10 illustrate various modular views of data that may be provided by a data server system using the techniques described herein. In particular, the views are visualizations derived from an example collection of time-based web log events. In an embodiment, different views may be selected and displayed as boxes within a dashboard-like interface. The views are merely examples of the many types of data that may be returned by a data server system that implements the described techniques.

Figure 7:
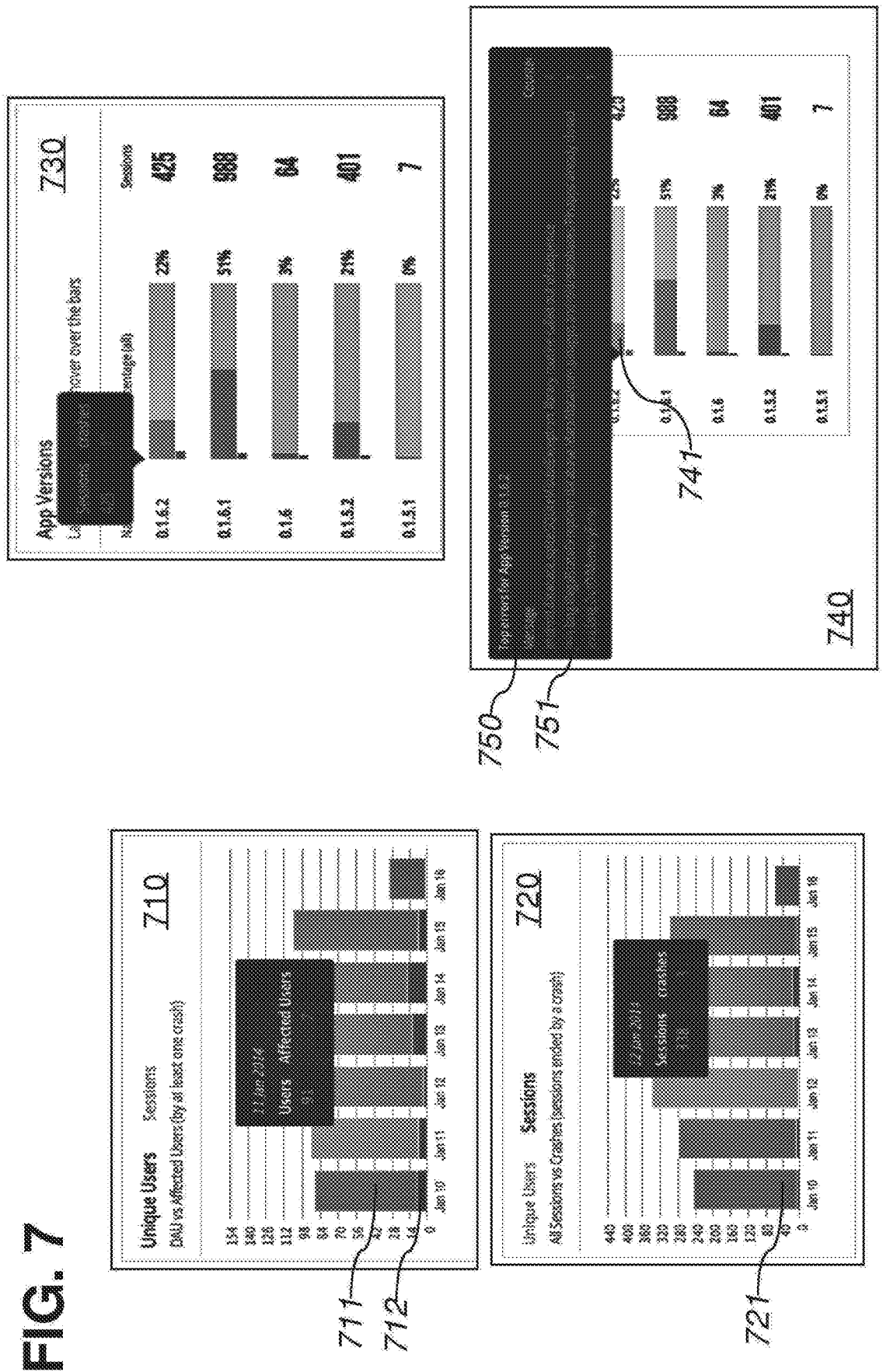
FIG. 7-FIG. 10 illustrate various modular views of data that may be provided by a data server system using the techniques described herein.

FIG. 7 illustrates modular boxes 710, 720, 730, and 740. Box 710 is a bar chart in which bars 711 visualize unique-users-per-day counters and bars 712 visualize affected-users-per-day counters. Box 720 is a bar chart in which bars 721 visualize sessions-per-day counters and bars 722 visualize crashed-sessions-per-day counters. Box 730 is a bar chart that visualizes per-session application version counters. Box 740 is the same as box 730, except that an explanatory pop-up 750 is depicted responsive to a user selecting a particular bar 741 in box 740. Explanatory pop-up 750 shows a list of per-application-version error type counters 751 for the application version corresponding to the selected bar 741.

Figure 8:
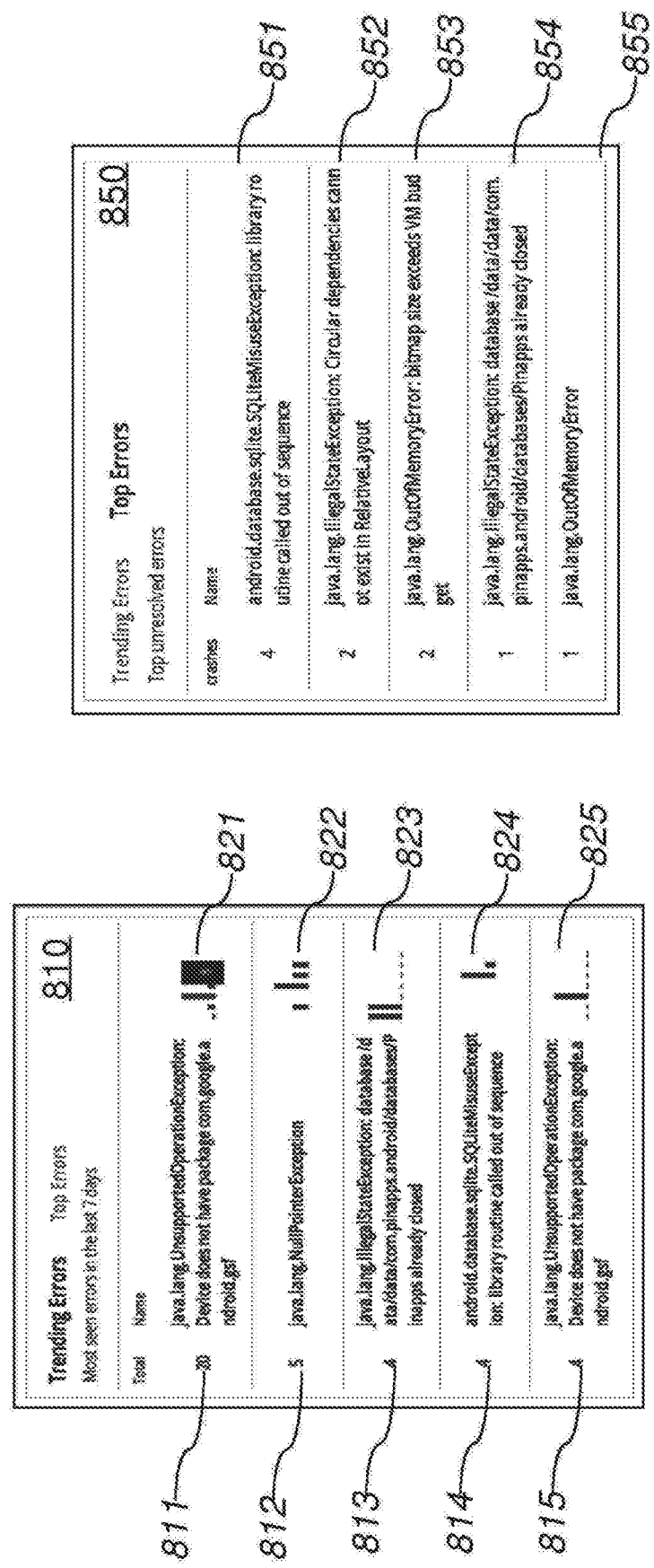

FIG. 8 illustrates modular boxes 810 and 850. Box 810 is a sorted list of error type counters 811-815 for a weekly period of time. In the depicted embodiment, box 810 is specifically adapted to reflect a "Trending Errors," list, indicating a set of errors that have occurred most often for the weekly period. Adjacent to error type counters 811-815 are bar charts 821-825. Bar charts 821-825 visualize, for each respective weekly error type counter 811-815, daily error type counters for each day of the weekly time period. Box 850 is a sorted list of error type counters 851-855, filtered to include only error types that have been indicated as being unresolved. In the depicted embodiment, box 810 is specifically adapted to reflect a "Top Errors," list, indicating a set of unresolved errors that have occurred most often relative to other unresolved errors.

Figure 9:
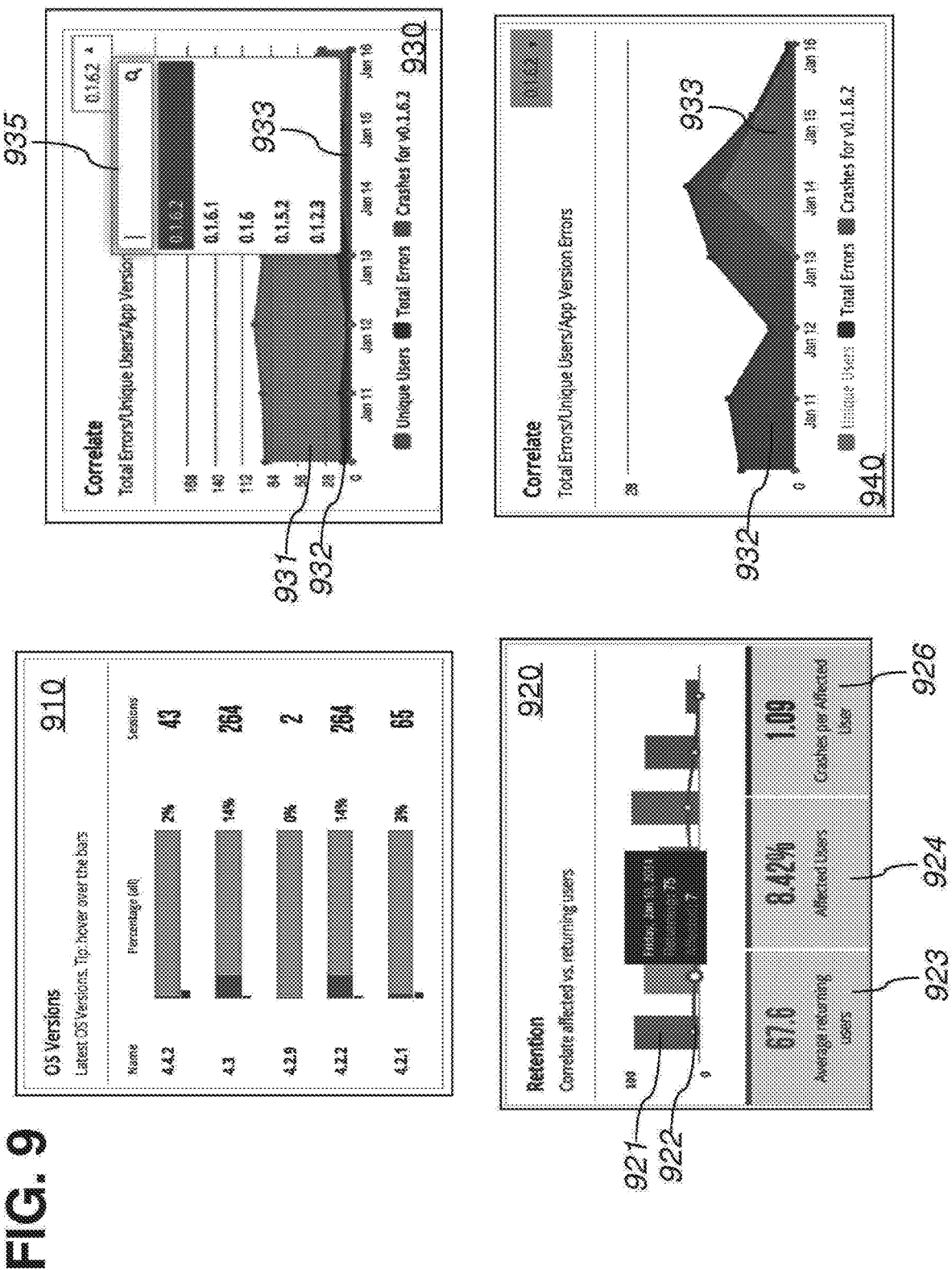

FIG. 9 illustrates modular boxes 910, 920, 930, and 940. Box 910 is a bar chart that visualizes per-session operating system version counters. In an embodiment, box 910, and/or other boxes described herein, may include a popup element such as popup element 750, in similar manner to box 740 of FIG. 7. Box 920 is a combination bar-line chart in which bars 921 visualize daily returning-user counters and line 922 visualizes daily affected-user counters. Also depicted are a weekly average of daily returning-user counters 923, a weekly average of daily affected-user counters 924, and a weekly average of crashes-per-affected-user 926. Box 930 is an area graph visualizing daily unique user counters 931, daily error counters 932, and daily application-version-specific crash counters 933. A filter box 935 permits selection of an application version whose application-version-specific crash counters are to be visualized. Box 940 is an area graph that is similar to box 930, except that unique user counters 931 have been filtered from the area graph.

Figure 10:
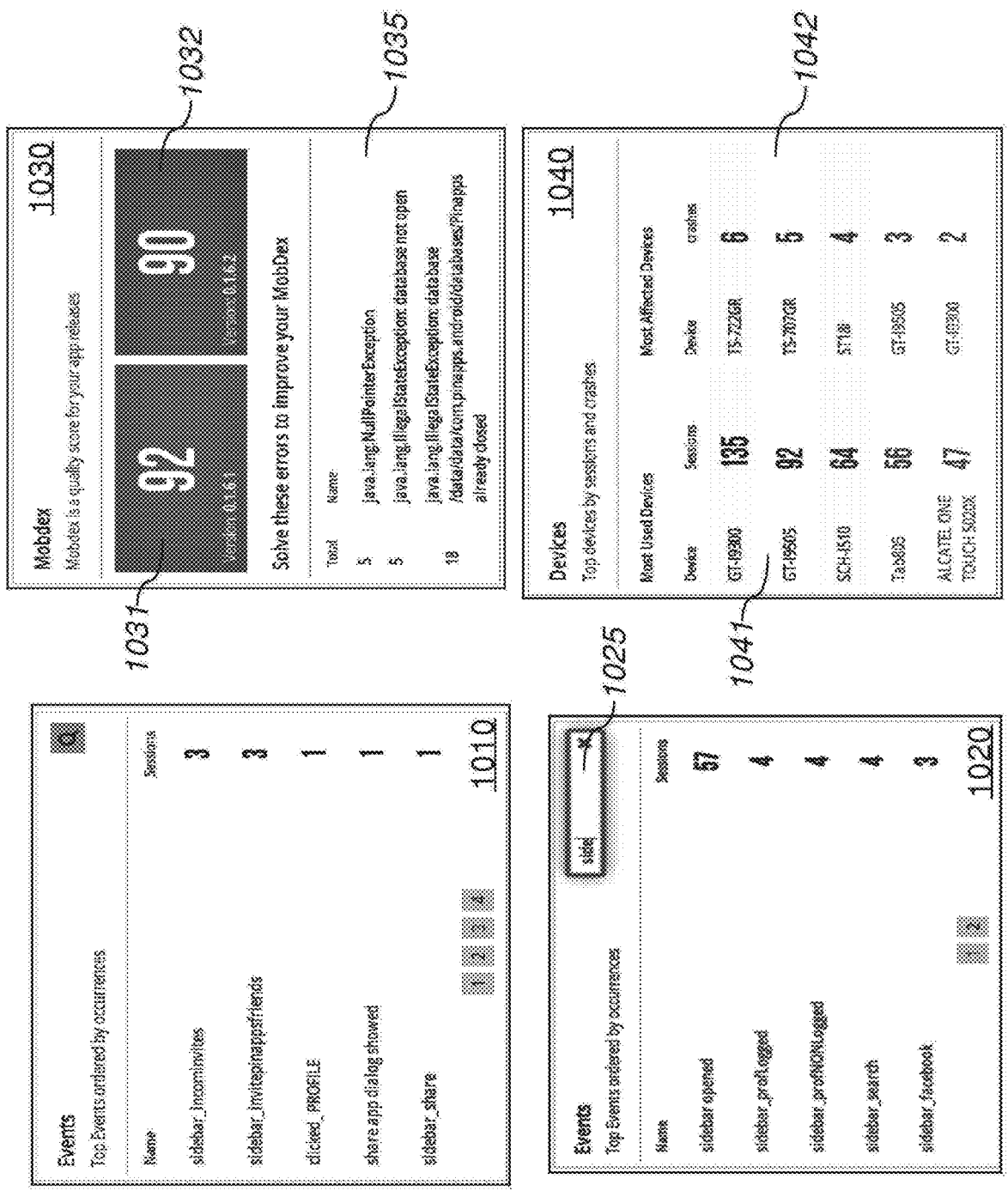

FIG. 10 illustrates modular boxes 1010, 1020, 1030, and 1040. Box 1010 is a list of event types, sorted by per-session event type counters. Box 1020 is a similar list, but filtered based on a keyword search in filter box 1025. Box 1030 includes per-application-version quality score metric indicators 1031 and 1032, calculated based on functions of the available data. Box 1030 further includes a list 1035 of error types, sorted by error type counters. Box 1040 includes a list 1041 of device types, sorted by sessions-per-device-type counters, and a list 1042 of device types, sorted by affected-session-per-device-type counters.

Note that, although separate embodiments are discussed herein, any combination of embodiments and/or partial embodiments discussed herein may be combined to form further embodiments.

7.0. Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
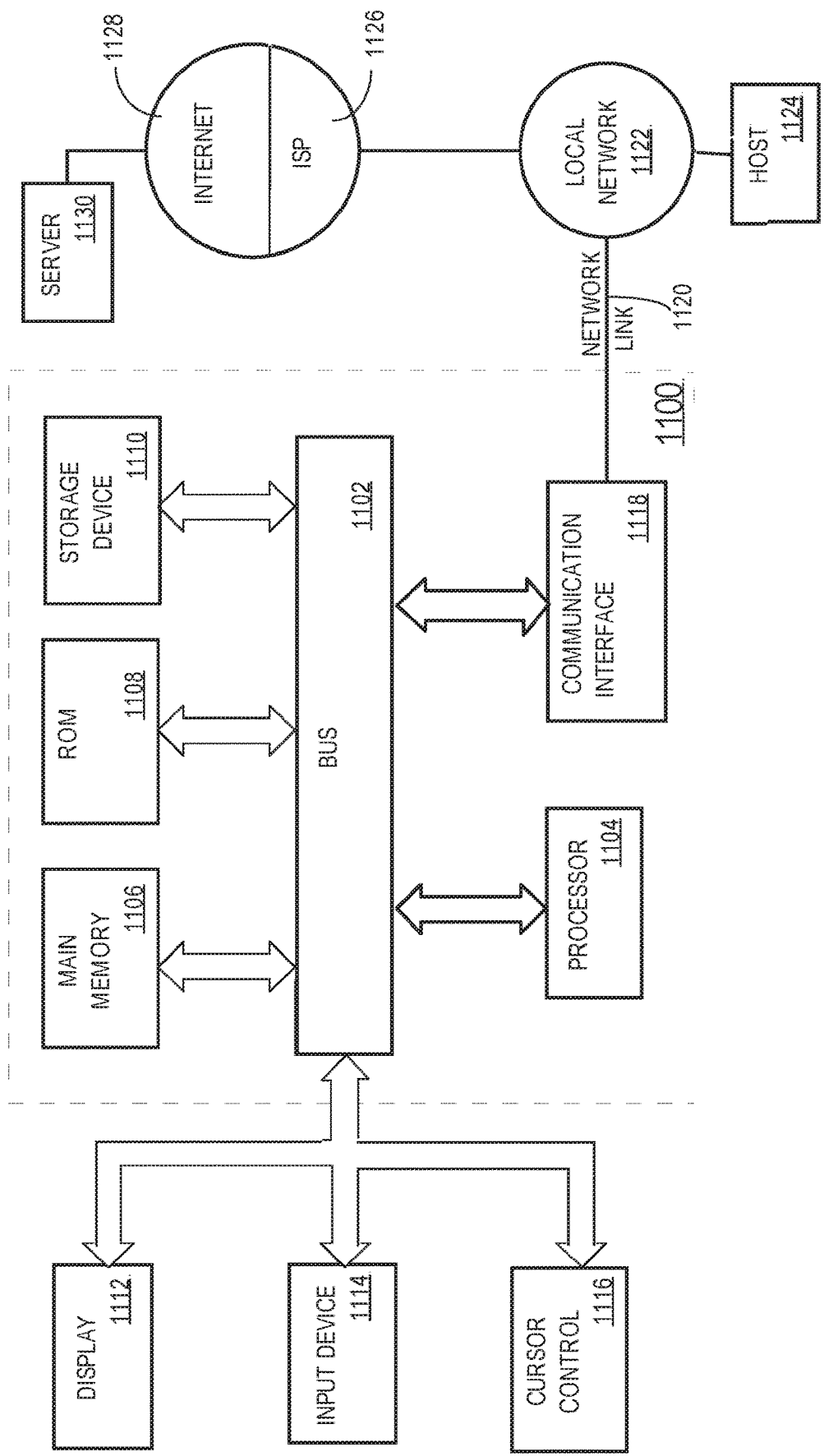
FIG. 11 illustrates a computer system upon which an embodiment may be implemented.

For example, FIG. 11 is a block diagram that illustrates a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

8.0. Example Embodiments

In an embodiment, a system comprises: one or more computer-readable storage devices storing a data repository, the data repository comprising different data collections; one or more computing devices comprising at least one or more memories and one or more processors; data server nodes, implemented at least partially by the one or more processors, configured to perform data operations on the data collections, each particular data server node assigned to one or more of the data collections and configured to process messages by performing particular data operations on the one or more data collections to which the particular data server node is assigned; a message distribution component, implemented at least partially by the one or more processors, configured to receive particular messages that are associated with particular data collections of the data collections, and distribute the particular messages to particular data server nodes that are assigned to the associated particular data collections; a node instantiation component, implemented at least partially by the one or more processors, configured to, when certain messages of the particular messages are associated with certain data collections to which none of the existing data server nodes are assigned, dynamically instantiate new data server nodes and assign those new data server nodes to corresponding ones of the certain data collections.

In an embodiment, the system further comprises: a collection loading component configured to generate in-memory working copies of the data collections by copying data collections from the data repository to the one or more memories; wherein the data server nodes are configured to perform the data operations with respect to the in-memory working copies; a collection saving component configured to periodically, and/or in response to certain triggers, save changes to the in-memory working copies to the data repository.

In an embodiment, the system further comprises a node monitoring component configured to cause certain less active data server nodes to terminate. In an embodiment, the system further comprises a node monitoring component configured to cause certain data server nodes to terminate, wherein the node monitoring component is configured to determine whether different data server nodes should be terminated based on different node-specific criteria associated with those different data server nodes.

In an embodiment, the system further comprises a collection loading component configured to generate in-memory working copies of the data collections by copying data collections from the data repository to the one or more memories; wherein the data server nodes are configured to perform the data operations with respect to the in-memory working copies; a node monitoring component configured to cause certain less active data server nodes to terminate; a collection saving component configured to save changes to the in-memory working copies to the data repository prior to termination of less active data server nodes.

In an embodiment, the data collections store time-based events, wherein at least some of the particular messages are requests to record new time-based events, and the data server nodes comprise data operation processing components configured to execute instructions for adding the new time-based events to the data collections. In an embodiment, the data collections store time-based events, wherein at least some of the particular messages are requests to generate data views derived from the time-based events, and the data server nodes comprise data operation processing components configured to, in response to the requests, execute instructions for generating pre-defined data views based on the time-based events.

In an embodiment, each data server node is a different set of one or more computer processes that executes within a different allocated memory space in the one or more memories, each different allocated memory space storing at least one different data collection to which the corresponding data server node has been assigned.

In an embodiment, a method comprises: monitoring data server nodes that perform data operations with respect to data collections, the data server nodes including different nodes that are assigned to different collections of the data collections; receiving a first request that indicates a first data operation to perform, the first request being associated with a first data collection identifier for a first data collection, of the data collections, with respect to which to perform the first data operation; responsive to the first request: determining whether the monitored data server nodes currently include any data server node assigned to the first data collection; responsive to determining that none of the monitored data server nodes is currently assigned to the first data collection, instantiating a first data server node; sending a second request to the first data server node that indicates the first data operation to perform.

In an embodiment, the data collections are sets of time-series based events, and the first request is a message comprising information about a new event. In an embodiment, the second request is the first request. In an embodiment, instantiating the first data server node comprises: allocating at least a portion of memory to the first data server node; loading a working copy of the first data collection from one or more storage devices into the portion of the memory, wherein the memory supports higher speed access than the one or more storage devices; instantiating one or more data server processes, including at least a first process that listens for communications, including the request.

In an embodiment, the method further comprises determining a period of time since the first data server node last processed a request that indicated a data operation to perform; based at least partially on the period of time exceeding a threshold period of time, terminating the first data server node. In an embodiment, the method further comprises loading a working copy of the first data collection from one or more storage devices into a memory that supports higher speed access than the one or more storage devices; at the first data server node, performing data operations, including the first data operation with respect to the working copy, resulting in changes to the working copy; periodically, and/or in response to one or more triggers, copying at least the changes in the working copy of the first data collection from the memory to the one or more storage devices; subsequent to performing the data operations, terminating the first data server node.

In an embodiment, the method further comprises: loading a working copy of the first data collection from one or more storage devices into a memory that supports higher speed access than the one or more storage devices; at the first data server node, performing the first data operation with respect to the working copy, resulting in a change to the working copy; subsequent to performing the first data operation, determining that the data server node is inactive; based at least partially upon determining that the first data server node is inactive: copying at least the change to the working copy of the first data collection from the memory to the one or more storage devices, and terminating the first data server node.

In an embodiment, the method further comprises: determining a period of time since the first data server node last processed a request that indicated a data operation to perform; based at least partially on the period of time exceeding a threshold period of time, terminating the first data server node; wherein terminating the first data server node comprises: writing the first data collection from the portion of the volatile memory to the non-volatile memory; deallocating the portion of the volatile memory; terminating one or more data server processes.

In an embodiment, the method further comprises: receiving a third request that indicates a second data operation to perform, the third request being associated with the first data collection identifier; responsive to the third request: determining whether the monitored data server nodes include any data server node assigned to the first data collection; responsive to determining that the first data server node is currently assigned to the first data collection, sending a fourth request to the first data server node to perform the second data operation.

In an embodiment, the method further comprises: at the first data server node, processing a plurality of requests, including the second request; subsequent to processing the plurality of requests, terminating the first data server node; subsequent to terminating the first data server node, receiving a third request that indicates a second data operation to perform, the third request being associated with the first data collection identifier; responsive to the third request: determining whether the monitored data server nodes currently include any data server node assigned to the first data collection; responsive to determining that none of the monitored data server nodes is currently assigned to the first data collection, instantiating a second data server node; sending a fourth request to the second data server node to perform the second data operation.

In an embodiment, the method further comprises: receiving a third request that indicates a second data operation to perform, the third request being associated with the second data collection identifier for a second data collection, of the data collections, with respect to which to perform the second data operation; responsive to the third request: determining whether the monitored data server nodes currently include any data server node assigned to the second data collection; responsive to determining that a second data server node is currently assigned to the first data collection, sending a fourth request to the second data server node to perform the second data operation.

9.0. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method for searching a plurality of events the method comprising:
   receiving a search query associated with a collection identifier, wherein the collection identifier identifies a particular data collection of a plurality of data collections that each include a portion of the plurality of events, wherein each of the plurality of events is a time stamped, searchable machine-data event;
   determining whether any data server node, that is assigned to the particular data collection based on the collection identifier associated with the search query, the collection identifier assigned in accordance with creation of the particular data collection, wherein
   when a particular data server node is determined to be assigned to the particular data collection, sending, in response to determining that the particular data server node is assigned to the particular data collection, the search query to the particular data server node based on the collection identifier associated with the search query, wherein upon receiving the search query, the particular data server node executes the search query, and
   when each data server node is unassigned to the particular data collection identified via the collection identifier in association with the search query, instantiating a new data server node and assigning the new data server node to the particular data collection;
   obtaining search results from the particular data server node or the new data server node assigned to the particular data collection; and
   causing display of a visualization of the search results from the particular data server node.

2. The method of claim 1, wherein the executing the search query executes the search query across events in a respective portion of the plurality of time-stamped, searchable events that have time stamps that occur within a specified time period.

3. The method of claim 1, wherein the search query includes a filtering criteria, and wherein the method further comprises:
   generating, by the particular data server node or the new data server node, the search results by applying the filtering criteria to events in a respective portion of the plurality of time-stamped, searchable events that satisfy the search query.

4. The method of claim 1, further comprising:
   generating, by the particular data server node or the new data server node, the search results by applying an aggregation operation to events in a respective portion of the plurality of time-stamped, searchable events that satisfy the search query.

5. The method of claim 1, further comprising:
   generating, by the particular data server node or the new data server node, the search results by applying one or more data operations to data in events in a respective portion of the plurality of time-stamped, searchable events that satisfy the search query.

6. The method of claim 1, further comprising:
   obtaining, from the particular data server node or the new data server node, data from the search results that are required for the visualization.

7. The method of claim 1, wherein executing the search includes:
   applying a schema to events in a respective portion of the plurality of time-stamped, searchable events, the schema indicating how to extract data from associated data included in an event.

8. The method of claim 1, wherein each portion of the plurality of time-stamped, searchable events is associated with configuration data that indicates aspects of events in a respective portion of the plurality of time-stamped, searchable events and affects processing of at least a portion of the events, via a data server node of the plurality of data server nodes.

9. The method of claim 1, wherein the collection identifier that identifies the particular data server node is included in the search query.

10. The method of claim 1, further comprising:
    determining whether to terminate the particular data server node based on an expected usage pattern for the particular data server node, wherein the expected usage pattern is dynamically determined based on monitoring a frequency of usage of the particular data server node.

11. One or more non-transitory computer-readable media storing instructions that, when executed by one or more computer devices, cause performance of actions comprising:
    receiving a search query associated with a collection identifier, wherein the collection identifier identifies a particular data collection of a plurality of data collections that each include a portion of the plurality of events, wherein each of the plurality of events is a time stamped, searchable machine-data event;

determining whether any data server node is assigned to the particular data collection based on the collection identifier associated with the search query, the collection identifier assigned in accordance with creation of the particular data collection, wherein when a particular data server node is determined to be assigned to the particular data collection, sending, in response to determining that the particular data server node is assigned to the particular data collection, the search query to the particular data server node based on the collection identifier associated with the search query, wherein upon receiving the search query, the particular data server node executes the search query, and when each data server node is unassigned to the particular data collection identified via the collection identifier in association with the search query, instantiating a new data server node and assigning the new data server node to the particular data collection;

obtaining search results from the particular data server node or the new data server node assigned to the particular data collection; and causing display of a visualization of the search results from the particular data server node.

12. The one or more non-transitory computer-readable claim 11, wherein the executing the search query executes the search query across events in a respective portion of the plurality of time-stamped, searchable events that have time stamps that occur within a specified time period.

13. The one or more non-transitory computer-readable claim 11, wherein the search query includes a filtering criteria and wherein the actions further comprise:

generating, by the particular data server node or the new data server node, the server search results by applying the filtering criteria to events in a respective of the plurality of time-stamped, searchable events that satisfy the search query.

14. The one or more non-transitory computer-readable medial of claim 11, wherein the actions further comprise:

generating, by the particular data server node or the new data server node, the search results by applying one or more data operations to data in events in a respective portion of the plurality of time-stamped, searchable events that satisfy the search query.

15. The one or more non-transitory computer-readable media of claim 11, wherein the actions further comprise:

applying a schema to events in a respective portion of the plurality of time-stamped, searchable events, the schema indicating how to extract data from associated machined data included in an event.

16. A system comprising:
one or more processors; and
a memory storing instructions, which when executed by the one or more processors, cause performance of actions comprising:

receiving a search query associated with a collection identifier, wherein the collection identifier identifies a particular data collection of a plurality of data collections that each include a portion of the plurality of events, wherein each of the plurality of events is a time stamped, searchable machine-data event;

determining whether any data server node is assigned to the particular data collection based on the collection identifier associated with the search query, the collection identifier assigned in accordance with creation of the particular data collection, wherein when a particular data server node is determined to be assigned to the particular data collection, sending, in response to determining that the particular data server node is assigned to the particular data collection, the search query to the particular data server node based on the collection identifier associated with the search query, wherein upon receiving the search query, the particular data server node executes the search query, and when each data server node is unassigned to the particular data collection identified via the collection identifier in association with the search query, instantiating a new data server node and assigning the new data server node to the particular data collection;

obtaining search results from the particular data server node or the new data server node assigned to the particular data collection; and causing display of a visualization of the search results from the particular data server node.

17. The system of claim 16, wherein the executing the search query executes the search query across events in a respective portion-of the plurality of time-stamped, searchable events that have time stamps that occur within a specified time period.

18. The system of claim 16, wherein the search query includes a filtering criteria and the actions further comprise:

generating, by the particular data server node or the new data server node, the search results by applying the filtering criteria to events in a respective portion of the plurality of time-stamped, searchable events that satisfy the search query.

19. The system of claim 16, wherein the actions further comprise:

applying a schema to events in a respective portion of the plurality of time-stamped, searchable events, the schema indicating how to extract data from associated machine data included in an event.

* * * * *